United States Patent
David et al.

(10) Patent No.: US 10,423,518 B2
(45) Date of Patent: Sep. 24, 2019

(54) SYSTEMS AND METHODS FOR ANALYZING VIOLATIONS OF CODING RULES

(71) Applicant: The MathWorks, Inc., Natick, MA (US)

(72) Inventors: Stefan David, Hohenkirchen-Siegertsbrunn (DE); Patrick Munier, St. Mury Monteymond (FR); Alexandre De Barros, Montbonnot St. Martin (FR); Bernd J. Kanamueller, Munich (DE); Peter S. Szpak, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 158 days.

(21) Appl. No.: 15/139,670

(22) Filed: Apr. 27, 2016

(65) Prior Publication Data

US 2017/0315903 A1    Nov. 2, 2017

(51) Int. Cl.
*G06F 11/36*   (2006.01)
*G06F 8/73*   (2018.01)
(Continued)

(52) U.S. Cl.
CPC .......... *G06F 11/3668* (2013.01); *G06F 8/447* (2013.01); *G06F 8/73* (2013.01); *G06F 8/75* (2013.01); *G06F 8/77* (2013.01)

(58) Field of Classification Search
CPC .......... G06F 8/73; G06F 8/30; G06F 11/3668; G06F 11/3688
(Continued)

(56) References Cited

U.S. PATENT DOCUMENTS 7,797,673 B2 *   9/2010   Szpak .................. G06F 8/34
                                                      715/762
8,336,030 B1 *   12/2012   Boissy .................. G06F 8/71
                                                      717/122
(Continued)

FOREIGN PATENT DOCUMENTS

WO   WO-2009/095741 A   8/2009

OTHER PUBLICATIONS

Medeiros et al., "Detecting and Removing Web Application Vulnerabilities with Static analysis and data Mining", IEEE, 17 Pages. (Year:2015).*
(Continued)

*Primary Examiner* — Bing Zhao
*Assistant Examiner* — Hui-Wen Lin
(74) *Attorney, Agent, or Firm* — Cesari and McKenna, LLP; Michael R. Reinemann

(57) ABSTRACT

Systems and methods automatically detect violations of coding rules of a coding standard in computer programming code. The systems and methods may mark the locations in the code where the violations are found. The coding rules may be mapped to code verification checks that check for undesired runtime behavior in the code. The systems and methods may identify the code verification check mapped to a given violation detected in the code. The systems and methods may apply that check to the code. If the check proves that the undesired runtime behavior will not occur, the violation may be marked as justified. If the check proves that the undesired runtime behavior will occur, the violation may be marked as not justified.

43 Claims, 19 Drawing Sheets

(51) Int. Cl.
*G06F 8/75* (2018.01)
*G06F 8/41* (2018.01)
*G06F 8/77* (2018.01)

(58) Field of Classification Search
USPC .................................................. 717/125, 126
See application file for complete search history.

(56) References Cited

U.S. PATENT DOCUMENTS

| | | | |
|---|---|---|---|
| 8,365,139 | B2 | 1/2013 | Szpak |
| 8,448,130 | B1 | 5/2013 | Pillarisetti et al. |
| 8,689,194 | B1 | 4/2014 | Pillarisetti et al. |
| 9,081,595 | B1 | 7/2015 | Delarue et al. |
| 9,244,510 | B1 | 1/2016 | Conrad et al. |
| 2014/0337819 | A1* | 11/2014 | Fahndrich ............ G06F 11/3608 717/122 |

OTHER PUBLICATIONS

Abraham, Jay, "Verification and Validation Spanning Models to Code," The MathWorks, Inc., Mar. 6, 2015, pp. 1-8.

Ben-Ari, Mordechai (Moti), "A Primer on Model Checking," Extended Papers, ACM Inroads, vol. 1, No. 1, Mar. 2010, pp. 40-47.

Cherukuri, Ram, et al., "Leverage Semantic Analysis of Polyspace Tools to Automatically Justify MISRA Violations," The MathWorks, Inc., Mar. 31, 2015, pp. 1-3.

Cousot, Patrick, et al., A Gentle Introduction to Formal Verification of Computer Systems by Abstract Interpretation, Ed. Javier Esparza et al., *Logics and Languages for Reliability and Security,* NATO Science for Peace and Security Series-D: Information and Communication Security, vol. 25, IOS Press, Mar. 2010, pp. 1-29.

D'Silva, Vijay, et al., "A Survey of Automated Techniques for Formal Software Verification," Keynote Paper, IEEE Transactions on Computer-aided Design of Integrated Circuits and Systems, vol. 27, No. 7, Jul. 2008, pp. 1165-1178.

Eisner, Cindy, "Formal Verification of Software Source Code Through Semi-Automatic Modeling," Springer International Publishing AG, Springer Nature, Springer Link, Software & Systems Modeling, vol. 4, Issue 1, Feb. 1, 2005, pp. 1-32.

"MISRA-C: 2004: Guidelines for the Use of the C Language in Critical Systems," MIRA Limited, Oct. 2004, pp. 1-116.

Moy, Yannick, et al., "Testing or Formal Verification: DO-178C Alternatives and Industrial Experience," FOCUS: Safety-Critical Software, IEEE Software, IEEE Computer Society, May/Jun. 2013, pp. 50-57.

"Polyspace® Bug Finder™: Getting Stated Guide," R2015a, The MathWorks, Inc., Mar. 2015, pp. 1-68.

"Polyspace® Bug Finder™: User's Guide," R2015a, The MathWorks, Inc., Mar. 2015, pp. 1-430.

"Polyspace® Code Prover™: Getting Stated Guide," R2015a, The MathWorks, Inc., Mar. 2015, pp. 1-66.

"Polyspace® Code Prover™: User's Guide," R2015a, The MathWorks, Inc., Mar. 2015, pp. 1-798.

"The Rational Rhapsody Family from IBM," IBM Software, IBM Corporation, Dec. 2012, pp. 1-12.

* cited by examiner

```
20  int32_T U;   /* '<Root>/U' */
21  int32_T Y;   /* '<Root>/Gain' */
22
23  /* Model step function */
24  void patent001_step (void)
25  {
26     int32_T tmp;
27
28     /* Abs: '<Root>/Abs' incorporates:
29      * Inport: '<Root>/U'
30      */
31     if (U < ( (int32_T) 0 ) )
32     {
33        tmp = -U;
34     }
35     else
36     {
37        tmp = U;
38     }
39
40     /* Gain: '<Root>/Gain' incorporates;
41      * Abs: '<Root/Abs'
42      */
43     Y = (tmp << ( (int8_T) 2) );
44  }
```

FIG. 6

```
1    int main (void)                          ~900
2    {                              ~902
3        unsigned int x;
4        unsigned short a, b; ~904
5                                                        ~906
6        a = get_value () ; // returns a value between 0 and 10
7        b = get_value () ; // returns a value between 0 and 10
8                                                        ~908
9        x = a + b; ~910
10
11       return (x) ;
12   }
```

Line 9: MISRA C:2012 10.6 (Required)
The value of a composite expression shall not be assigned to an object with wider essential type. The composite expression is assigned to an object with a wider essential type.

```
1    int main (void)
2    {                              ~902
3        unsigned int x;
4        unsigned short a, b; ~904
5                                                        ~906
6        a = get_value () ; // returns a value between 0 and 10
7        b = get_value () ; // returns a value between 0 and 10
8                                                        ~908
9        x = a + b; ~910
10
11       return (x) ;
12   }
```

FIG. 10

```
1     int  main (void)                          ~1100
2     {
3         unsigned  int  x;  ~902
4         unsigned  short  a, b;  ~904          ~906
5
6         a = get_value ();  // returns a value between 0 and 10
7         b = get_value ();  // returns a value between 0 and 10
8                                                             ~908
9         x = a + b;  ~910
10    %   MISRA C:2012 10.6  (Required)
11    %   JUSTIFIED : Conversion  from  int 32  to  unsigned  int 32
12    %       right :  [0 ... 20]                                    }~1102
13    %       result :  [0 ... 20]
14        return (x) ;
15    }
```

FIG. 11

```
                                              ~1200
1    int glb_number_of_gears ;  ~1202
2
3    int number_of_gear_ratios = 5 ;  ~1204
4
5    int number_of_drive_shafts ;  ~1206
6
```

FIG. 12

SYSTEMS AND METHODS FOR ANALYZING VIOLATIONS OF CODING RULES

BRIEF DESCRIPTION OF THE DRAWINGS

The invention description below refers to the accompanying drawings, of which:

FIG. 6 is a schematic illustration of a portion of computer programming code in accordance with an embodiment;

FIG. 9 is a schematic illustration of a portion of computer programming code in accordance with an embodiment;

FIG. 10 is a schematic illustration of a report of a coding rule violation in accordance with an embodiment;

FIG. 11 is a schematic illustration of a code verification report in accordance with an embodiment;

FIG. 12 is a schematic illustration of a portion of computer programming code in accordance with an embodiment;

DETAILED DESCRIPTION OF ILLUSTRATIVE EMBODIMENTS

Figure 1:
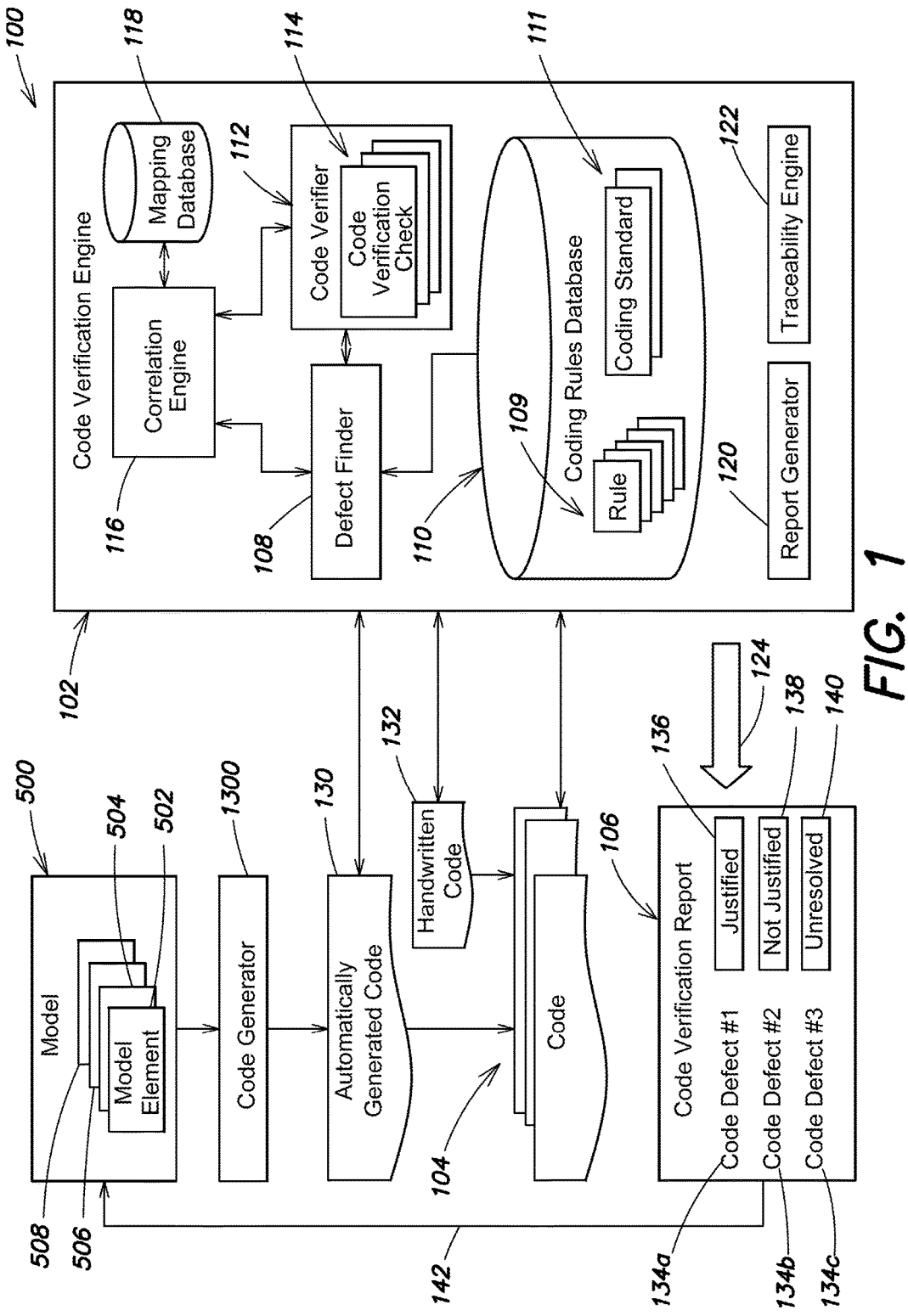
FIG. 1 is a schematic illustration of a verification environment in accordance with an embodiment.

Automobiles, aircraft, and other large, complex systems, often include software elements for controlling the systems' various components. The software elements may be implemented on embedded hardware. Software elements involved in safety critical applications, such as software that controls safety critical systems, may be required to comply with a coding standard developed for that environment. For example, the Motor Industry Software Reliability Association (MISRA) has developed coding standards for computer programming code written in the C and C++ programming languages. These coding standards are known as the MISRA C:1998, MISRA C:2004, MISRA C++:2008, and MISRA C:2012 coding standards. Other coding standards include the Joint Strike Fighter Air Vehicle C++ (JSF++) coding standard, the High Integrity C (HIC) coding standard, and the High Integrity C++ (HIC++) coding standard.

A coding standard typically includes a number of rules. Some of the rules may be characterized as mandatory, while others may be characterized as advisory. Rules that are not mandatory, such as advisory rules, may be referred to as guidelines. To be deemed compliant with a coding standard, computer programming code may need to meet all of the mandatory rules of the coding standard. In addition, the code's compliance with a coding standard may need to be documented in a particular manner.

As it is being developed, computer programming code may include many violations of a coding standard. Each of these violations may need to be evaluated by a programmer. The programmer may decide upon a course of action for each violation. For example, some violations may require modifications to the code so that the violation will not occur on subsequent evaluations. Other violations, upon manual examination by the programmer, may be deemed to be justified by the programmer, meaning no change to the code is required. The process of evaluating violations, determining whether they are justified, and documenting the justification can be time-consuming, causing delays in the release of the code. In addition, the modifications made to correct violations may themselves introduce new defects into the code, increasing the effort for further testing. The modifications may also increase the size of the code and/or negatively impact its performance.

Briefly, the present disclosure relates to systems and methods for analyzing computer programming code, automatically detecting violations of coding rules, and automatically determining whether those violations are justified. The justifications for the detected violations may be documented in one or more reports associated with the code. The computer programming code can be automatically generated by a code generator, handwritten, or a combination of both.

In some implementations, during automatically generating computer programming code, the code generator can generate code with known violations of coding standards. For example, some coding standards are required to ensure transferability of the generated code among different target hardware platforms. When the code is generated for a selected target hardware without the need for transfer, the code generator can use the information about the selected target hardware platform to generate code that is target specific and more efficient, but that violations these coding standards. The violations may be prejustified, prior to violation detection after the code is generated. Information about the prejustification may be recorded. In some implementations, the prejustified violations may not be further detected and/or justified following code generation. Efficiency of the code generation and justification processes may thus be improved. In some implementations, the prejustified violations may be detected and/or justified following code generation. Such a justification process can provide confidence to the code generator's prejustification process.

FIG. 1 is a schematic illustration of a verification environment 100 in accordance with an embodiment. The environment 100 may include a code verification engine 102 that may analyze code 104 and produce a code verification report 106. The code verification engine 102 may include a defect finder 108 that may access a first database 110 containing one or more coding rules, indicated generally at 109. The coding rules 109 may be organized into one or more coding standards, indicated generally at 111. The code verification engine 102 may further include a code verifier 112 that may include or have access to one or more code verification checks, indicated generally at 114. The defect finder 108 may identify violations of one or more coding rules 109 in code being analyzed, such as the code 104. The code verifier 112 may apply one or more of the code verification checks 114 to the code 104 to prove that the existence of the violations has no undesired program behavior, such as an adverse runtime behavior, on the code 104. If the code verifier 112 proves that a given violation will not cause an undesired program behavior, the given violation may be reported by the code verification engine 102 as justified.

The code verification checks 114 may check for undesired program behavior, and may involve static analysis techniques, dynamic analysis techniques, or both. The code verification checks 114 applied by the code verifier 112 may include formal proofs, static analysis, abstract interpretation, semantic code analysis, range analysis, mathematical checks, and/or utilize other techniques. The checking of code may include applying formal proofs through static analysis of the code. The checking of code may also include executing the code using test inputs and/or test parameters and evaluating the code's behavior. The checking of code may also involve including one or more assertion statements in the code that fire, e.g., return or output True or False, when the code is compiled and an undesired behavior occurs. The checking also may involve including one or more assertion statements that fire when the code is executed and an undesired behavior occurs. It should be understood that other techniques may be used.

The code verification engine 102 also may include a correlation engine 116 having access to a second database 118 that contains suggested code verification checks 114 for violations of coding rules. In some embodiments, the second database 118 assigns selected code verification check(s) 114 to a coding rule 109, so that when a violation of the coding rule occurs, the correlation engine 116 automatically chooses the selected code verification check(s) 114 to be applied to the code 104 by the code verifier 112 to determine whether the violation can be justified. The corresponding code verification check(s) may evaluate the identified violations, and determine whether they are safe, e.g., have no undesired behavioral impacts. The code verifier 112 may evaluate execution paths of the code 104, such as control and data flow paths, and determine that notwithstanding the existence of a detected coding rule violation, no undesired program behavior will occur. If so, the detected violation may be deemed justified, and no discussion between development teams or modification to the code 104 are required. The one or more code verification check(s) that are suggested for a given coding rule violation may be determined through a mapping process that identifies one or more code verification checks capable of determining whether undesired program behaviors to be avoided through compliance with the rule will occur.

In some embodiments, the defect finder 108 may suppress violations that it might otherwise flag.

The coding rules 109 may be defined by coding standard committees, and groups of rules may be included in one or more of the coding standards 111, including public standards, like the MISRA series of coding standards, and/or private or proprietary coding standards, which may be defined by and implemented by an organization, such as a software development company.

The code verification engine 102 may further include a report generator 120 that generates the report 106, as indicated by arrow 124.

The verification environment 100 may include a model, such as a computer-generated, executable model 500 of a system being designed. The model 500 may be a graphical model having a plurality of model elements, such as model elements 502-508. The verification environment 100 also may include a code generator 1300 that may generate code 130 automatically for the graphical model 500. The verification environment 100 also may include handwritten code 132 that may be combined with the automatically generated code 130 for the model 500 to form the code 104 being verified. It should be understood that the code verification engine 102 may alternatively or additionally analyze the automatically generated code 130 and/or the handwritten code 132. In some embodiments, there may be no model 500 or automatically generated code 130, just the handwritten code 132.

The defect finder 108 may analyze any of the code 104, the automatically generated code 130, or the handwritten code 132, and identify violations, for example, defects, errors, or bugs, corresponding to the coding rules being applied. The violations, moreover, may be identified in the code verification report 106, as indicated at first, second and third coding rule violations 134*a*-*c*. The defect finder 108 may label the coding rule violations 134*a*-*c* with an identity of the respective rule being violated. In some embodiments, the report generator 120 may generate a report listing the coding rule violations identified by the defect finder 108. The report may include links, such as hyperlinks, to the sections of the code where the coding rule violations were located.

In the example shown in FIG. 1, the correlation engine 116 may examine the coding rule violations 134*a*-*c*, and determine, based on information in the mapping database 118, whether one or more code verification checks 114 correspond to the rules involved in the coding rule violations 134*a*-*c*. If so, the correlation engine 116 may engage the code verifier 112 to apply the corresponding one or more code verification checks 114 to the code 104. If the application of the one or more checks 114 proves that no undesired program behaviors will occur, e.g., the code passes, the report generator 120 may apply a 'justified' label to the respective coding rule violation in the report 106 and/or to the code, as indicated by the 'justified' label 136 applied to the first coding rule violation 134*a*.

If the code fails the application of the one or more code verification checks 114, the report generator 120 may apply a 'not justified' label to the respective coding rule violation, as indicated by the 'not justified' label 138 applied to the second coding rule violation 134*b*. If the application of the one or more corresponding code verification checks 114 to a coding rule violation fails to either prove that the undesired program behavior will not occur or that the undesired program behavior will occur, the report generator 120 may apply an 'unresolved' label to the coding rule violation, as indicated by the 'unresolved' label 140 applied to the third coding rule violation 134*c*. It should be understood that other designations, labels, or markers may be used, such as color coding or color maps. For example, the color green may be used to identify justified violations. The color orange may be used to identify unresolved violations. The color red may be used to identify not justified violations.

Thus, even though the defect finder 108 may locate numerous occurrences of violations of coding rules 109 in the code 106, many of the violations may be automatically justified by the code verification engine 102, such as the first coding rule violation 134*a*. Because the justifications are supported by the code verification checks 114 of the code verifier 112, such coding rule violations may not be corrected. Accordingly, significant time and resources may be saved, speeding up the code development and release process. In addition, optimal code may be produced.

Coding rule violations that are not justified, such as the second coding rule violation 134*b*, may be analyzed by the programmer, and the coding rule violation in the code 104 may be corrected. For unresolved coding rule violations, such as the third coding rule violation 134c, the programmer may apply other verification methodologies, such as test cases, to determine whether the unresolved coding rule violations may be deemed justified or whether a correction to the code 104 should be made.

The code verification engine 102 may include a traceability engine 122. The traceability engine 122 may trace portions of the code 104 back to the model 500. For example, portions of the code 104 as identified in the verification report 106 may be traced back to one or more elements 502-508 of the model 500, as indicated by arrow 142. The programmer may modify the model 500, and direct the code generator 1300 to generate new code for the revised model, which may then be subject to testing by the code verification engine 102.

In some embodiments, selection of one or more code verification checks 114 for a given coding rule violation may be performed dynamically. For example, the code 104 may be analyzed and a coding rule violation may be identified. The correlation engine 116 may dynamically select one or more code verification checks 114 to evaluate the particular coding rule violation. The selection of the code verifications checks 114 may be context dependent. For example, the selection may be based on one or more characteristics or attributes of the portion of the code 104 at which the coding rule violation was detected.

In some embodiments, the defect finder 108 may be a static analysis tool. An exemplary defect finder is the Polyspace Bug Finder product from The MathWorks, Inc. of Natick, Mass. The Polyspace Bug Finder is a static analysis tool that analyzes control flow, data flow, and inter-procedural behavior of source code, and can find numerical, programming, static memory, dynamic memory, and dataflow defects in code. Other exemplary defect finders include PC-lint from Gimpel Software LLC of Collegeville, Pa., QA-C from Programming Research Ltd. of Dublin, Ireland, and Klocwork from RogueWave Software, Inc. of Louisville, Colo.

In some embodiments, the code verifier 112 may be a formal code verifier. An exemplary code verifier is the Polyspace Code Prover product from The MathWorks, Inc. The Polyspace Code Prover product uses abstract interpretation, a formal methods technique, with static code analysis to prove, identify, and diagnose run-time errors in source code as well as prove their absence. The Polyspace Code Prover product also proves other code properties, such as unreachable code and valid ranges of variables. Other exemplary code verifiers include Astree from AbsInt Angewandte Informatik GmbH of Saarbruecken, Germany and Frama-C, an open source software platform.

In some embodiments, the defect finder 108 and the code verifier 112 analyze source code without compiling or running the code. That is, the analysis may be free of compiling. It may also be free of running the code.

The mapping database 118 may include information associating particular code verification checks 114 to coding rules 109. For example, the mapping database 118 may include information assigning one or more code verification checks to coding rules. As indicated, groups of the coding rules 109 may be organized into coding standards 111, and the group of rules of a given coding standard may be applied to the code being analyzed. Exemplary coding standards include the MISRA C:1998, MISRA C:2004, MISRA C++: 2008, MISRA C:2012, Joint Strike Fighter Air Vehicle C++ (JSF++), High Integrity C (HIC), and High Integrity C++ (HIC++) coding standards. Nonetheless, it should be understood that other coding standards may be utilized with the present disclosure. For example, companies or other entities may define their own internal coding rules and/or coding standards.

In some embodiments, the information in the mapping database 118 may be determined manually. For example, a developer may analyze the rules 109 to determine the rules' underlying rationales. An underlying rationale of a coding rule may be a potential compilation, runtime, or other error to be avoided through compliance with the rule. In some embodiments, the underlying rationale may be an optimization or other efficiency to be achieved by not violating the rule. The coding standard itself may set forth the rationales for at least some of its coding rules.

The developer may also analyze the code verification checks 114 utilized by the code verifier 112. The developer may determine whether a given code verification check can prove that the undesired program behavior(s) or error(s) to be avoided by complying with a given rule will or will not occur. To the extent compliance with a given rule is intended to achieve an optimization or efficiency, the developer may determine whether one or more code verification checks can prove that the optimization or efficiency will or will not occur.

It may be determined that more than one code verification check 114 can test for the underlying rationale of a rule 109. In this case, all of the code verification checks may be associated with the rule. It also may be determined that a particular sequence of code verification checks can test for a rule's underlying rationale. In this case, the sequence of checks may be associated with the rule. In addition, in some cases, there may not be any code verification checks associated with some of the rules. For example, it may be determined that none of the code verification checks can prove whether an underlying rationale of a rule will occur or be avoided.

In some embodiments, the detection of violations may be automatically suppressed by the code verifier 112.

In some embodiments, the code verifier 112 may include or have access to the following code verification checks 114:

Absolute address (ABS_ADDR)—proves whether an absolute address is assigned to a pointer;

C++ specific checks (CPP)—proves whether an array size is not strictly positive, whether a typeid operator dereferences a NULL pointer, and whether a dynamic cast operator performs an invalid cast;

Correctness condition (COR)—proves whether an array is mapped to a larger array through a pointer cast, whether a function pointer points to a function with a valid prototype, and whether a global variable falls outside of the range specified through a Global Assert mode;

Division by zero (ZDV)—proves whether the right operand of a division or modulus operation is zero;

Exception handling (EXC)—proves whether a function call throws an exception and whether the exception is caught;

Function not called (FNC)—proves a function definition to determine whether the function is called anywhere in the code;

Function not reachable (FNR)—proves a function to determine whether the only call to the function is from an unreachable part of the code;

Function returns a value (FRV)—proves whether a function with a return type other than void returns a value;

Illegally dereferenced pointer (IDP)—proves a pointer dereference to determine whether the pointer points outside of its bounds;

Initialized return value (IRV)—proves whether a function with a return type other than void returns a value at every function call;

Inspection points (IPT)—a user specified proof providing range information on specified variables;

Invalid use of standard library routine (STD_LIB)—proves a standard library function call to determine whether the function is called with valid arguments;

Non-initialized local variable (NIVL)—proves whether a local variable is not initialized before being read;

Non-initialized pointer (NIP)—proves whether a pointer is not initialized before being read;

Non-initialized variable (NIV)—proves whether a variable (other than a local variable) is not initialized before being read;

Non-null this-pointer in method (NNT)—proves a this pointer dereference to determine whether the pointer is NULL;

Non-terminating call (NTC)—proves whether a called function does not return to its calling context;

Non-terminating loop (NTL)—proves whether a loop does not terminate or contains an error in one of its iterations;

Object oriented programming (OOP)—proves whether a dereference of a this pointer or a pointer to a method is valid;

Out of bounds array index (OBAI)—proves whether an array is accessed outside of its range;

Overflow (OVFL)—proves whether an arithmetic operation causes an overflow;

Shift operations (SHF)—proves whether a shift operation is invalid;

Unreachable code (UNR)—proves whether a section of code can be reached during execution; and User assertion (ASRT)—proves whether the argument to an assert macro is true.

It should be understood that fewer, additional, or other code verification checks 114 may be included.

If it is determined that one or more code verification checks 114 or a sequence of checks 114 can prove whether the underlying rationale of a rule, e.g., its undesired behavioral impact, will be avoided or will occur, then the one or more code verification checks 114 or the sequence of checks 114 may be assigned to that rule. The mappings of code verification checks 114 to coding standard rules 109 may be stored at the mapping database 118, which may be implemented as one or more lookup tables, in some embodiments.

For example, MISRA-C Rule 9.1 states that "All automatic variables shall have been assigned a value before being used". The standard further states that The intent of this rule is that all variables shall have been written to before they are read. This does not necessarily require initialization at declaration.

A determination may be made that the Non-initialized variable (NIV) code verification check, which proves whether a variable other than a local variable is not initialized before being read, could prove that the undesired program behavior the rule seeks to avoid will or will not occur when the code is run.

In another example, MISRA-C Rule 13.6 states that "Numeric variables being used within a for loop for iteration counting shall not be modified in the body of the loop." A determination may be made that the Non-terminating loop (NTL) check, which proves whether a loop does not terminate or contains an error in one of its iterations, could prove that the error that the rule seeks to avoid will or will not occur when the code is run.

In another example, MISRA-C Rule 10.1 states:

The value of an expression of integer type shall not be implicitly converted to a different underlying type if:
(a) it is not a conversion to a wider integer type of the same signedness, or
(b) the expression is complex, or
(c) the expression is not constant and is a function argument, or
(d) the expression is not constant and is a return expression.

A determination may be made that the Overflow (OVFL) check, which proves whether an arithmetic operation causes an overflow, could prove that the undesired program behavior that the rule seeks to avoid will or will not occur when the code is run.

Figure 2:
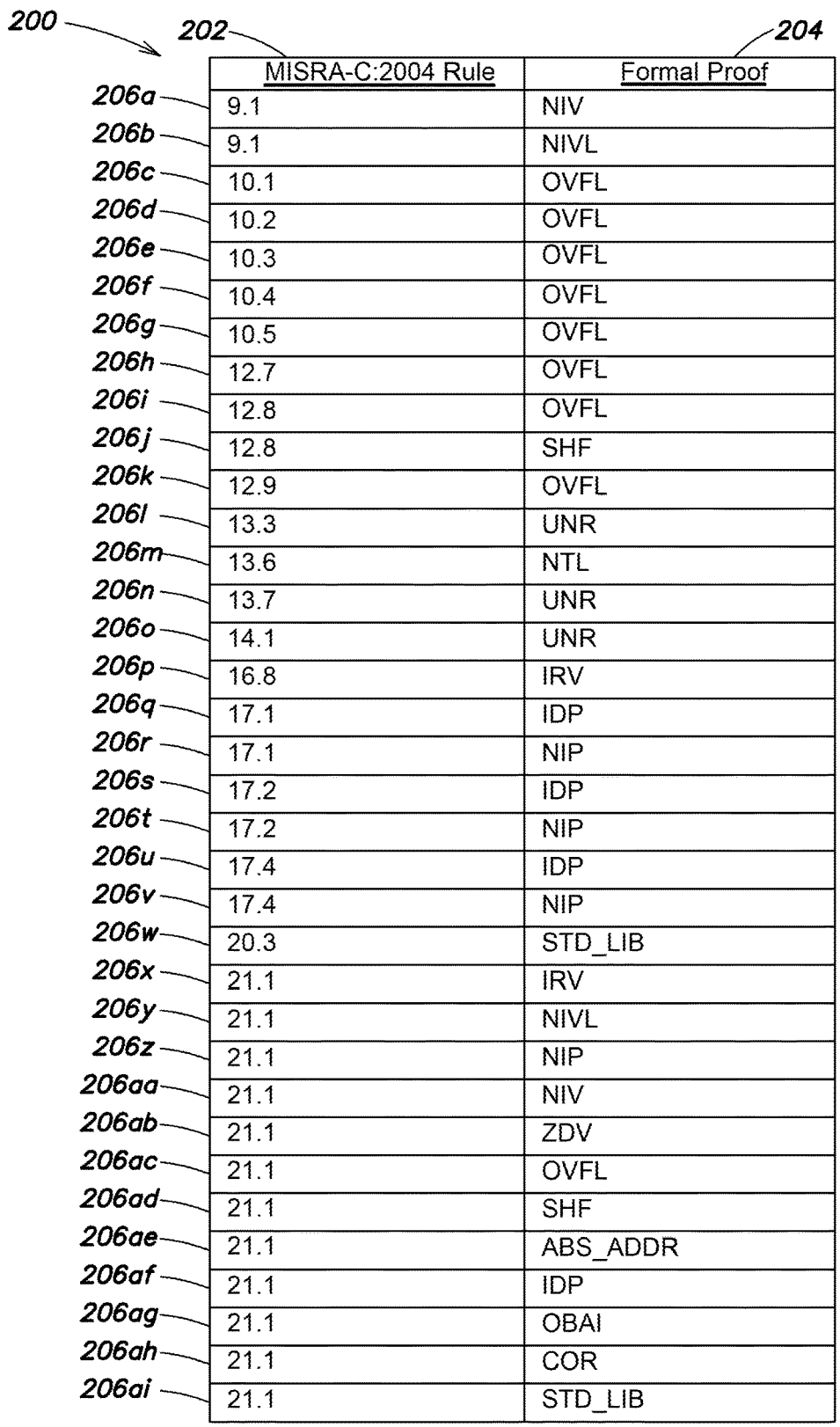
FIG. 2 is a schematic illustration of a data structure in accordance with an embodiment.

FIG. 2 is a schematic illustration of a mapping table 300, which may be included in the mapping database 118 (FIG. 1). The mapping table 300 may provide a correlation of MISRA-C:2004 rules to code verification checks 114. The mapping table 200 may include rows and columns whose intersections define cells for storing data. For example, the mapping table 200 may include a first column 202 for storing information regarding MISRA-C:2004 rules, such as identifiers of the rules, and a second column 204 for storing information about code verification checks, such as the names of the code verification checks. The mapping table 200 also may include a plurality of rows 206a-ai. Each row 206 may include the identifier of a particular MISRA-C:2004 rule, for example by rule number, in the first column 202, and the name(s) of the code verification check(s) assigned to the respective rule in the second column 204. The mapping table 200 may be stored at the mapping database 118.

It should be understood that the mapping table 200 is for illustrative purposes, and that the mapping of code verification checks to coding standard rules may be implemented in other data structures besides tables, such as linked lists. In other embodiments, the mapping may be stored in multiple data structures.

It should be understood that the mapping database 118 may include information mapping code verification checks to rules of multiple coding standards. For example, a second mapping table (not shown) may be included in the mapping database 118 that maps code verification checks to the rules of the JSF AV++coding standard.

Figure 3A:
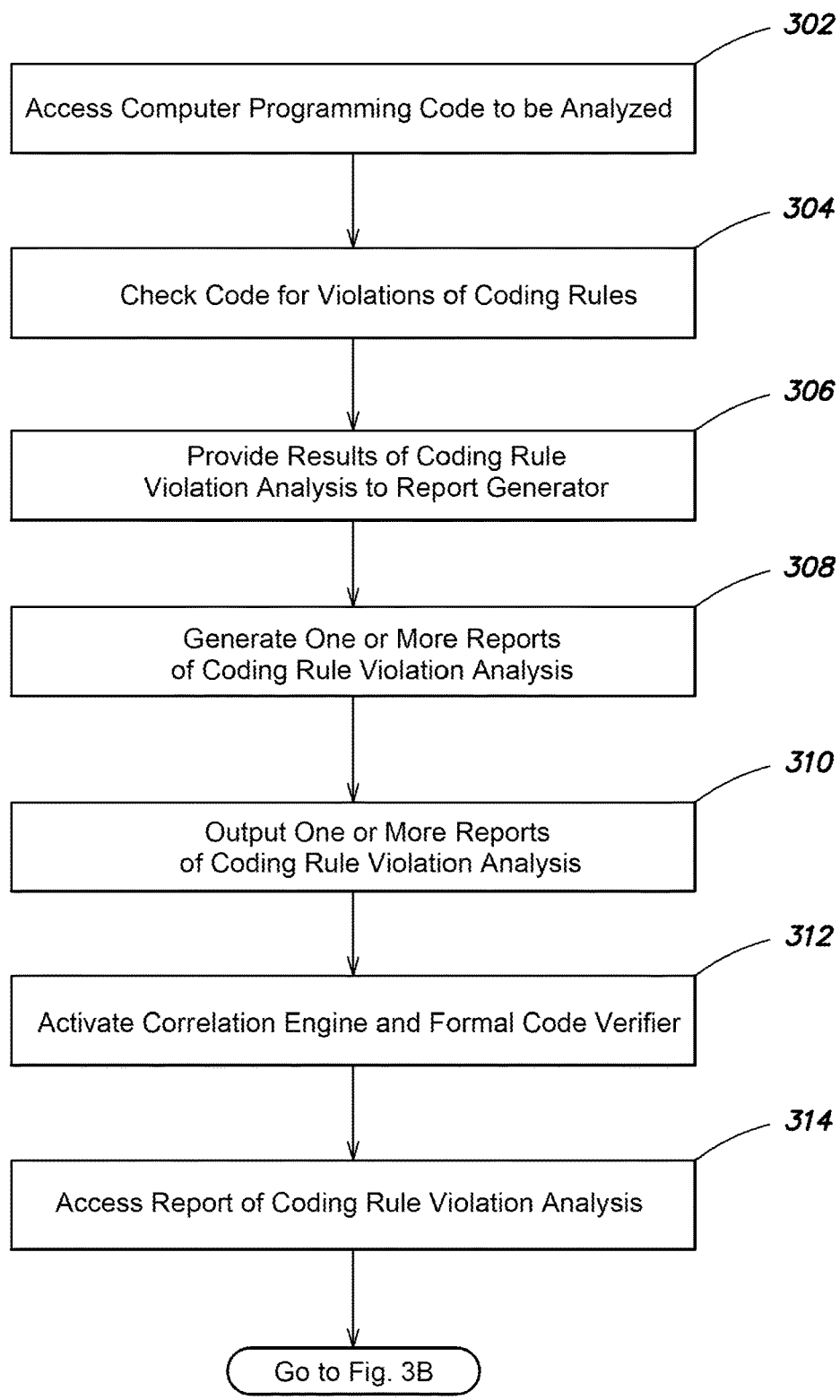
FIGS. 3A-3C are partial views of a flow diagram of a method in accordance with an embodiment.
Figure 3B:
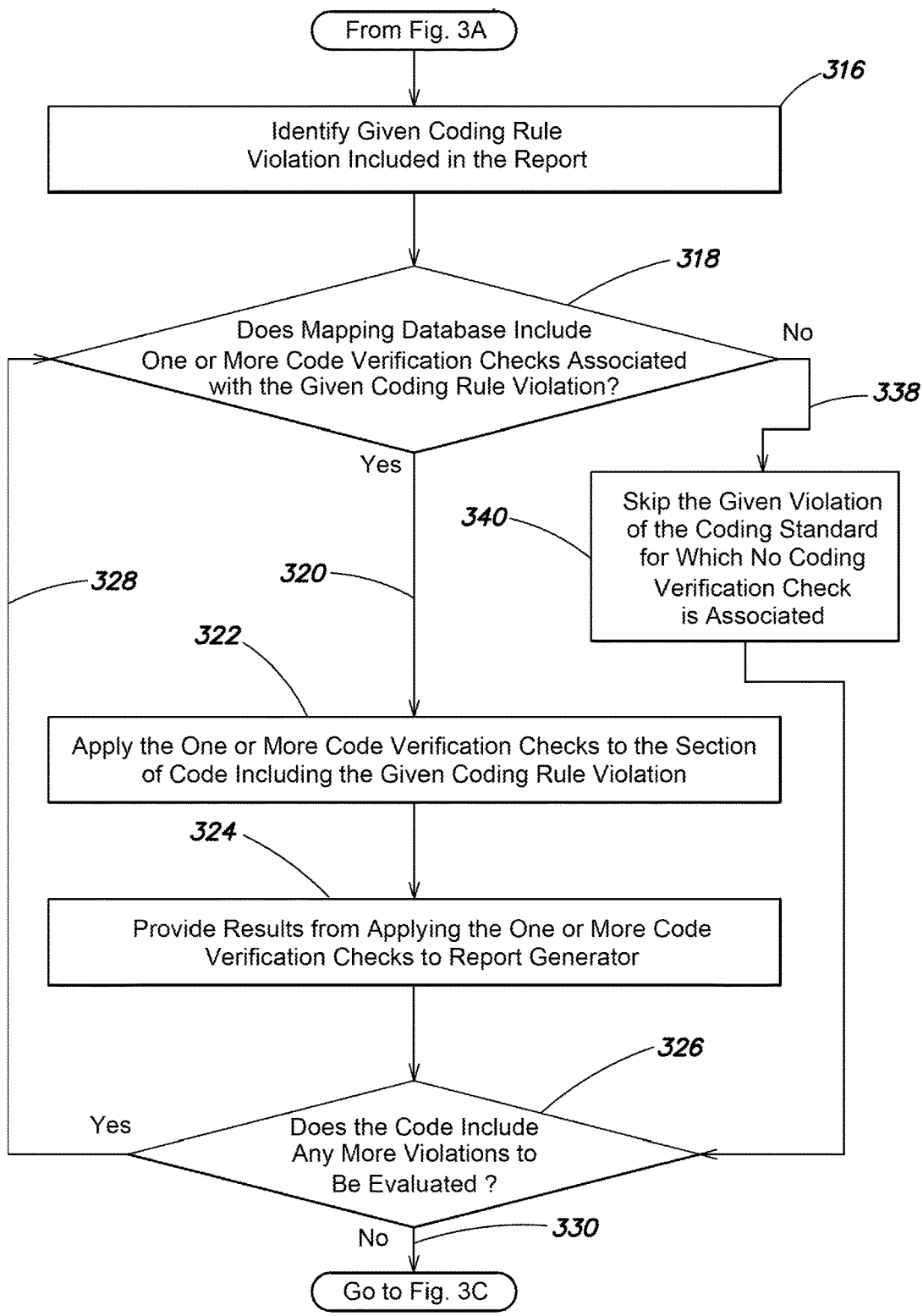
Figure 3C:
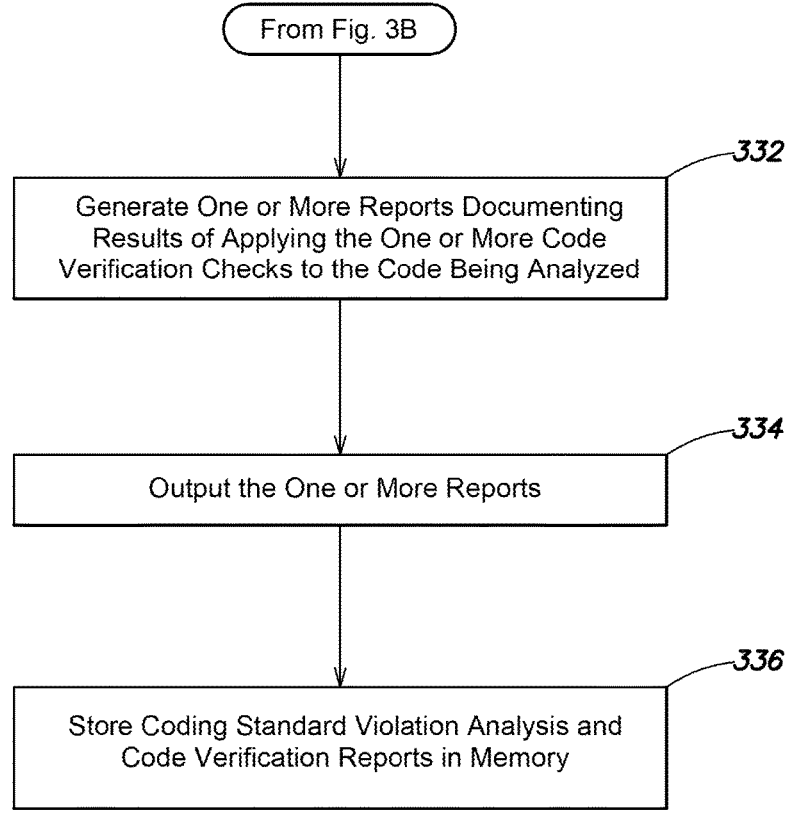

FIGS. 3A-3C are partial views of a flow diagram of a method in accordance with an embodiment.

The code verification engine 102 may access computer programming code to be analyzed, such as the code 104, as indicated at step 302. As noted, the code 104 to be analyzed may be code generated from a model, such as an executable graphical model, it may be handwritten code, or it may be a combination of generated and handwritten code. The defect finder 108 may analyze the code 104, and automatically determine whether the code includes any violations of coding rules, as indicated at step 304. The defect finder 108 may use static analysis to analyze the control flow, data flow, and inter-procedural behavior of the code 104 to find violations of coding rules. In an embodiment, a coding standard may be determined, and the code 104 may be checked for violations of the rules of the coding standard. The coding rules and/or coding standard may be determined programmatically or through user input received by the defect finder 108. For example, a user may select a desired coding standard and/or particular coding rules through one or more option settings included in an options dialog for a code verification process and/or specified in one or more configuration files.

The defect finder 108 may provide the results of its analysis of the code 104 to the report generator 120, as indicated at step 306. The results may include the location within the code 104 of the violations, and the particular coding rules that are violated. The report generator 120 may generate one or more reports containing the results of the defect detection process, as indicated at step 308. The report generator 120 may output the one or more reports, as indicated at step 310.

In some embodiments, the defect finder 108 may store the results of its coding rule violation analysis in a repository. The repository may be stored at a data processing device, such as a server that may be remote from the data processing device hosting the code verification engine 102.

In some embodiments, the report generator 120 may generate an annotated version of the code 104 by adding comments to the code 104 regarding the coding rule violations detected by the defect finder 108. The report generator 120 may present the annotated and/or commented version of the code in a code editor window presented on a display.

Upon completing its analysis, the defect finder 108 may activate the correlation engine 116 and the code verifier 112, as indicated at step 312. The correlation engine 116 may examine the report containing violations of the coding rules, as indicated at step 314. For example, the report may have a specified format, and the correlation engine 116 may include logic for parsing the report to extract particular information therefrom. The correlation engine 116 may identify a given coding rule violation from the report, as indicated at step 316 (FIG. 3B). Upon identifying the given coding standard violation, the correlation engine 116 may access the mapping database 118, and determine whether one or more code verification checks 114 have been assigned to the particular coding rule violation identified in the report, as indicated at decision step 318. For example, the report may identify the coding rule that is violated, and the correlation engine 116 may determine whether one or more code verification checks 114 are associated with that rule. If one or more code verification checks 114 are associated with the coding rule violation, the correlation engine 116 may engage the code verifier 112 and direct it to apply the one or more code verification checks 114 to the code 104, as indicated by Yes arrow 320 leading to step 322.

The one or more code verification checks 114 may be applied at the location in the code at which the particular coding rule violation was found. In some embodiments, the one or more code verification checks 114 may alternatively or additionally be applied to other locations or to a combination of locations. For example, the code verifier 112 may use control and data flow analysis to trace through the code 104 to determine where to apply the one or more code verification checks 114 given the type of violation and its location in the code 104. The one or more code verification checks 114 may check the code for an undesired program behavior, and the checking of the code may include applying formal proofs or testing the code, among other techniques.

In some embodiments, the correlation engine 116 may include logic for managing the code verification process. For example, the correlation engine 116 may activate the defect finder 108, examine the coding rule violations detected in the code 104, determine the particular code verification checks 114 mapped to the detected coding standard violations, activate and direct the code verifier 112 to apply those code verification checks 114, and activate and direct the report generator 120 to document the coding rule violations determined, e.g., proven, to be justified. In other embodiments, the correlation engine 116 may execute one or more scripts that searches the report, locates instances of coding rule violations, determines the code verification check(s) assigned to a given violation, and causes the code verifier 112 to run the code verification check(s), for example at the location in the code where the violation was detected and/or at other locations.

The code verifier 112 may apply the one or more code verification checks 114 assigned to the particular coding rule violation to a section of the code that includes the location at which the particular violation was found, or to another section of code as determined from control and data flow analysis. The code verifier 112 may calculate range information for variables and function return values defined in the code 104. In some embodiments, the code verifier 112 may apply range analysis to justify a violation without the need for range analysis to be mapped to the particular violation. For each code verification check 114 being applied, the outcome may be that the section of code is: (1) proven to be free of undesired program behaviors; (2) proven to have an undesired program behavior, e.g., be faulty, each time the section of code is executed; (3) proven to be unreachable; or (4) determined to be faulty under certain conditions. The code verifier 112 may provide the results following the application of the one or more code verification checks 114 to the report generator 120, as indicated at step 324.

If the code verifier 112 determines that the coding rule violation does not produce an undesired program behavior, for example, it does not result in a runtime error, it may deem the violation a false positive. In addition, the report generator 120 may use a first label to mark the respective violation in the code as a false positive, for example, it may mark the violation as 'justified'. If the code verifier 112 determines that the section of code containing the violation is proven to be faulty, the report generator 120 may use a second label to mark the respective violation as 'not justified'. If the code verifier 112 determines that the section of code containing the violation may be faulty under certain conditions, the report generator 120 may use a third label to mark the respective violation as 'unresolved'.

In some embodiments, the correlation engine 116 and the code verifier 112 may apply the one or more code verification checks 114 sequentially as the coding rule violations are encountered during the correlation engine's analysis of the report. In some embodiments, the correlation engine 116 and the code verifier 112 may batch process the code verification checks 114.

The code verification engine 102 may determine whether the code 104 includes one or more additional violations to be evaluated, as indicated at decision step 326. If so, processing may return to step 318 as indicated by Yes arrow 328. If all of the detected violations have been evaluated, the report generator 120 may generate a report, as indicated by No arrow 330 leading to step 332 (FIG. 3C). The report generator 120 may also output the report, as indicated at step 334.

In some embodiments, the report generator 120 and/or the code verifier 112 may prioritize the results of the code verification checks. For example, not justified violations may be prioritized over inconclusive and justified violations to assist in the review. It should be understood that other filtering or prioritizing schemes may be used.

In some embodiments, the report generator 120 or the code verifier 112 may annotate a version of the code by adding information regarding the result from applying the verification check(s) 114 to the code. In some embodiments, the report generator 120 or the code verifier 112 may add comments to the code describing the result from applying the verification check(s) 114. This further annotated and/or commented code may be presented in the code editor window.

The report generator 120 may include within the report information regarding the one or more code verification checks 114 that were run on the code, and the results from those code verification checks. For example, the report generator 120 may include the name and/or other information regarding the code verification checks 114 that were applied. The report generator 120 may store the reports together with the code 104 or it may store the reports in a manner that is associated with the code 104, as indicated at step 336. For example, the reports may be stored in a project that includes the code 104, in a source code repository, or in some other container or data structure. The project may further include the model 500, the automatically generated code 130, and the handwritten code 132. Accordingly, the results of the code verifier 112 may form part of the software verification documentation for the code 104.

Returning to decision step 318 (FIG. 3B), if a coding standard violation is found for which no code verification check 114 is associated, the correlation engine 116 and/or code verifier 112 may skip that violation, as indicated by No arrow 338 leading to step 340. Such violations may be reported as "not analyzed". Processing may then continue at decision step 326.

In some embodiments, the code verifier 112 may evaluate the entire code, not just the locations at which coding rule violations were found. The code verifier 112 may thus determine whether the code 104 includes any elements that result in undesired program behaviors, such as run-time errors. If the code verifier 112 identifies one or more elements of the code 104 that result in undesired program behaviors, and these elements were not identified by the defect finder 108, such elements may be designated as false negatives, e.g., coding rule violations that were not located by the defect finder 108.

Figure 4:
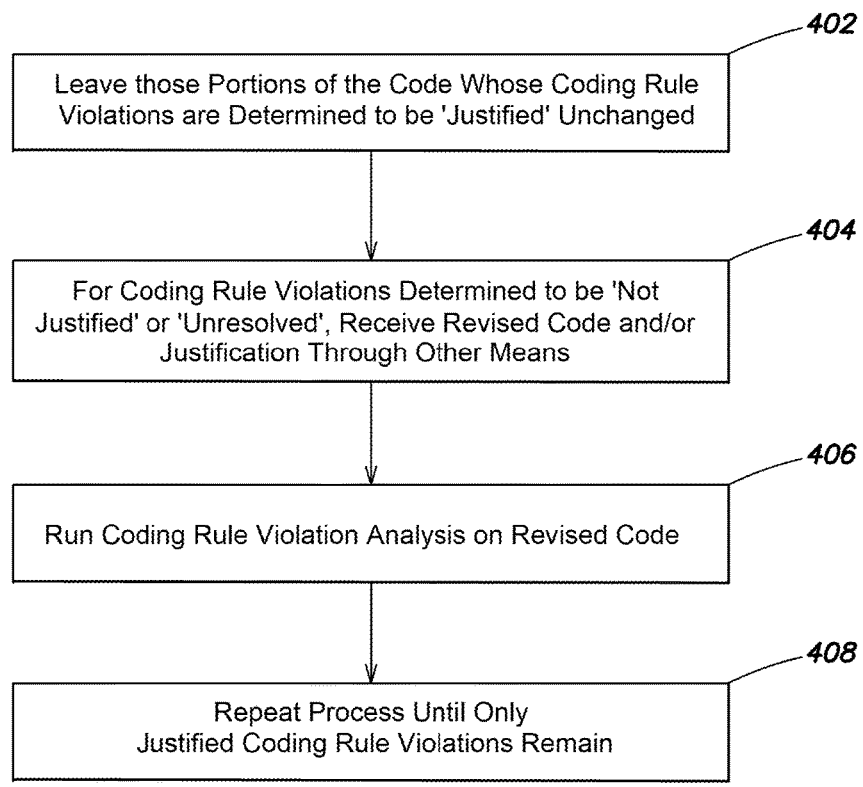
FIG. 4 is a flow diagram of a method in accordance with an embodiment.

FIG. 4 is a flow diagram of a method in accordance with an embodiment. Sections of the code 104 having the coding standard violations found to be 'justified' by the code verification engine 102 may be left unchanged, as indicated at step 402. For example, a programmer may not modify or change these sections of the code 104. For those violations determined to be 'not justified' or 'unresolved', revised code sections may be received, as indicated at step 404. For example, the programmer may review and revise these portions of the code 104 to correct the condition that gave rise to the coding standard violations. Alternatively or additionally, the programmer may also utilize other means to determine whether the violations are justified, as also indicated at step 404. The defect finder 108 may then be run on this revised code to see whether the changes eliminated the violations, as indicated at step 406.

In some embodiments, the entire process of detecting coding standard violations and applying associated code verification checks may be repeated, until only justified violations (if any) remain in the code, as indicated at step 408. In some embodiments, a user may decide that processing may be complete even though one or more of the violations remain unjustified.

Figure 5:
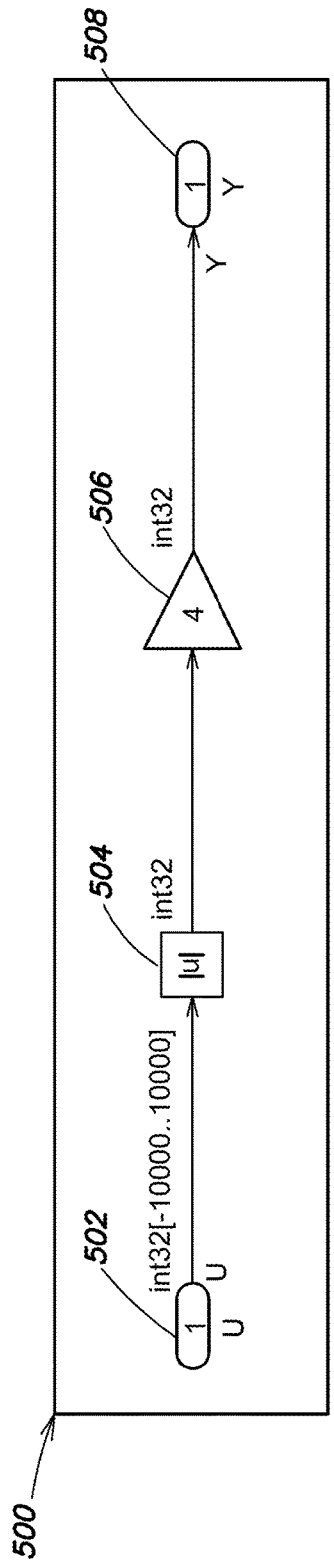
FIG. 5 is a schematic illustration of an executable graphical model in accordance with an embodiment.

FIG. 5 is a schematic illustration of the executable graphical model 500. The model 500 includes the four model elements 502-508 described above. The first model element 502 may be an Inport block 502. The second model element 504 may be an Absolute block 504. The third model element 506 may be a Gain block 506 with a gain parameter of four. The fourth model element 508 may be an Outport block 508. The model 500 may receive an input signal, 'U', at its Inport block 502, and compute an output signal, 'Y', by taking the absolute of the input signal and applying the gain value to the result. The model 500 may provide the output signal 'Y' at its Outport block 508. The input signal U is constrained to be a 32-bit integer whose value can range from −10,000 to 10,000.

FIG. 6 is a schematic illustration of a code portion 600 of the code 130 (FIG. 1) generated for the model 500. The code portion 600 may be source code conforming to the C programming language, and may be organized into a plurality of lines of code, such as lines 20-44.

Figure 7:
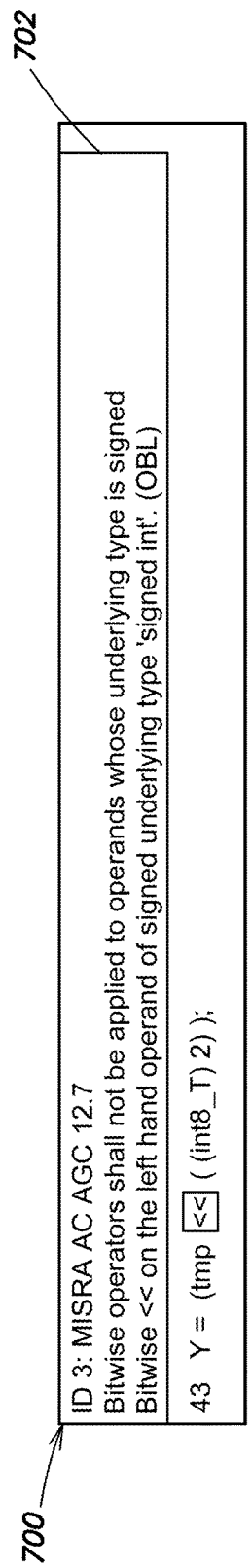
FIG. 7 is a schematic illustration of a portion of a report in accordance with an embodiment.

FIG. 7 is a schematic illustration of a portion of a first report 700 generated by the report generator 120 following the analysis of the code portion 600 by the defect finder 108. The first report 700, which may be termed a bug report, may include an entry 702 indicating that a violation of the MISRA C coding standard was detected at line 43 of the code portion 600. Specifically, the entry 702 indicates that a violation of Rule 12.7 was detected at line 43 of the code portion 600.

Rule 12.7 states that "Bitwise operators shall not be applied to operands whose underlying type is signed." The coding standard notes that bitwise operations are not normally meaningful on signed integers, and that problems can arise when shift operators are applied to signed integers. As indicated at row 306ah of the mapping table 300 (FIG. 3), the Overflow (OVFL) code verification check is assigned to Rule 12.7. Accordingly, the correlation engine 116 may direct the code verifier 112 to apply the OVFL code verification check to line 43 of the code portion 600. The results of this verification may be provided to the report generator 120.

Figure 8:
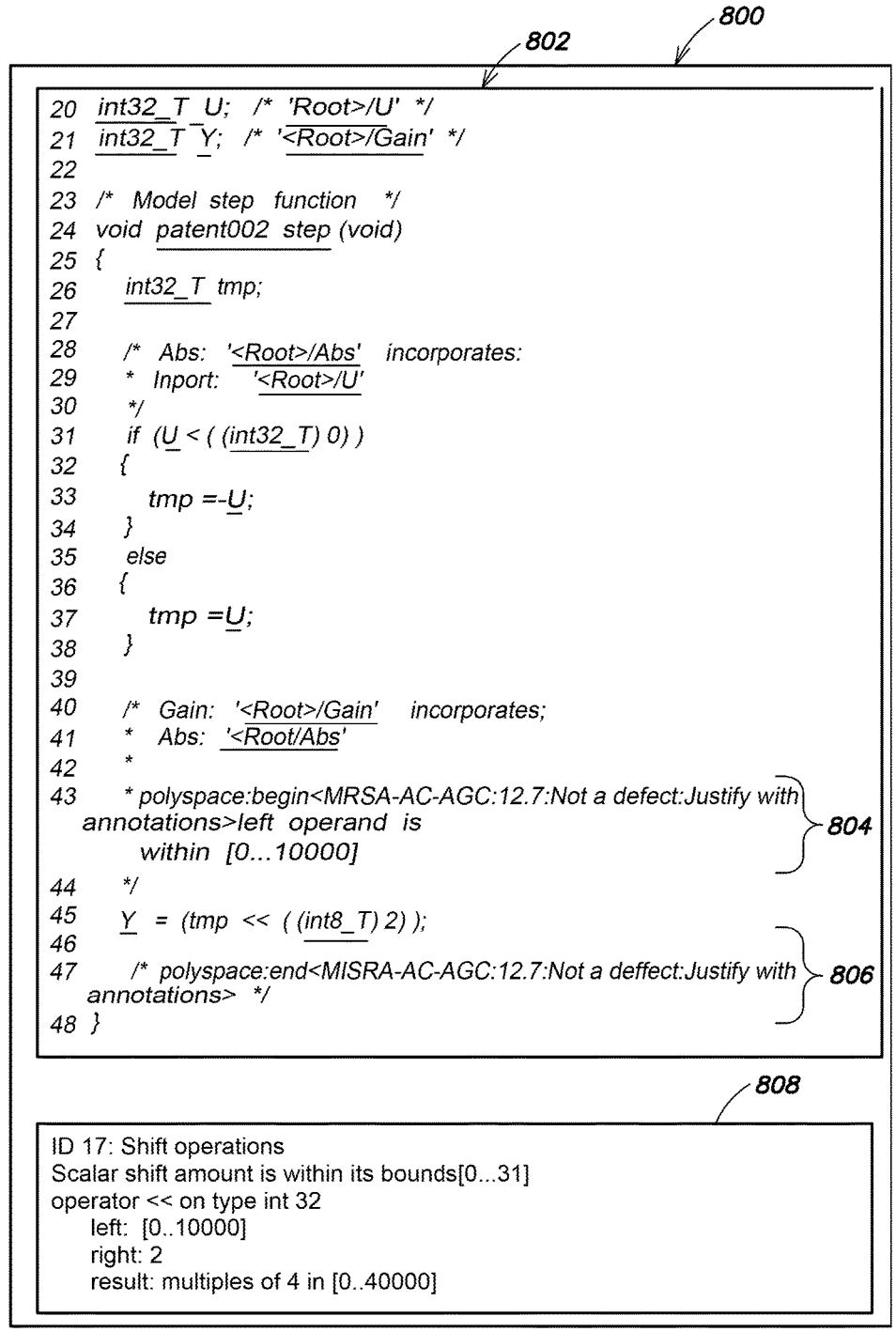
FIG. 8 is a schematic illustration of a portion of a report in accordance with an embodiment.

FIG. 8 is a schematic illustration of a second report 800 generated by the report generator 120 following the analysis of the code portion 600 by the correlation engine 116 and the code verifier 112. In some embodiments, the second report 800, which may be termed a verification report, may be an annotated version of the code being evaluated, as indicated generally at 802. The annotated version 802 may include one or more entries or annotations with the verification results. For example, the second report 800 may include a first annotation 804 indicating where in the code portion 600 the code verifier 112 began application of the OVFL code verification check to the code portion 600, and a second annotation 806 indicating where in the code portion 600, the code verifier 112 ended application of the OVFL code verification check. As noted in the first and second annotations 804 and 806, the violation of Rule 12.7 has been automatically found to be justified. That is, the undesired program behavior sought to be avoided by complying with Rule 12.7, namely a possible overflow, has been proven not to occur at line 43 of the code portion 700. The second report 800 also may include a detailed entry 808 documenting the justification for the violation of Rule 12.7 detected at line 43 of the code (FIG. 7).

It should be understood that other characters and/or symbols, besides '*', may be used in the annotated code to indicate a violation, such as '<<'.

In some embodiments, the second report 800 may be separate from, and not be an annotated version of the code 104. In such cases, the second report 800 may include links, such as hyperlinks, to sections of the code 104 corresponding to results of code verification checks 114. In some embodiments, the results from the coding standard violation analysis, e.g., the bug report, and the results from the verification analysis, as illustrated in FIGS. 7 and 8, may be combined or consolidated into a single report FIG. 9 is a schematic illustration of a portion 900 of the code 104. The code portion 900 may include a plurality of lines of code that specify particular code elements, such as statements. At line 3, indicated at 902, the variable x is declared a type "unsigned int". At line 4, indicated at 904, the variables a and b are declared a type "unsigned short". At lines 6 and 7, indicated at 906 and 908, values for the variables a and b are determined. At line 9, indicated at 910, the code portion 900 computes the value of variable x by adding the values of variables a and b.

The defect finder 108 may analyze the code portion 900 utilizing the rules from a coding standard, such as the MISRA C:2012 coding standard. The defect finder 108 may identify a violation of Rule 10.6 of the MISRA C coding standard in the code portion 900. Rule 10.6 requires the value of a composite expression not be assigned to an object with a wider essential type. The defect finder 108 may determine that the variable x has a type "unsigned int", while variables a and b have a type "unsigned short". At line 9, the composite expression "a+b" is assigned to the variable x, which has a wider essential type, i.e., "unsigned int", than variables a and b, i.e., "unsigned short". Accordingly, the defect finder 108 may find a violation of Rule 10.6 at line 9 of the code portion 900.

FIG. 10 is a schematic illustration of a report 1000 indicating the coding rule violation identified by the defect finder 108 in the code portion 900. The report 1000 may be an annotated version of the code portion 900 that includes an entry 1002 specifying the coding rule violation found in the code portion 900. The entry 1002 specifies that a violation of Rule 10.6 of the MISRA C:2012 coding standard was identified at line 9 of the code portion 900.

The correlation engine 116 may identify one or more code verification checks 114 that correspond to Rule 10.6 of the MISRA C:2012 coding standard, and may direct the code verifier 112 to apply these one or more code verification checks 114 to the code portion 900, for example at the location of the identified violation or at another location. For example, a range analysis check may be associated with Rule 10.6 The check may determine the range of values that may be assigned to the variable involved in the detected violation, here the variable x, if the code portion 900 were to be executed. The code verifier 112 may analyze the code portion 900 (and/or other portions of the code) to determine the range of values that may be assigned to the variables a and b, which are used to compute the value of variable x. The code verifier 112 may determine that variables a and b are defined at lines 6 and 7. The code verifier 112 may further determine that, if the code portion 900 were executed, the values of variables a and b range between 0 and 10. The code verifier 112 may thus determine that line 9 of the code portion 900 converts variables a and b having a type "int 32" to variable x having type "unsigned int 32", which is not a wider essential type. Accordingly, the code verifier 112 has proven that the detected violation will have no undesired program behavior, and the violation may therefore be designated as justified.

FIG. 11 is a schematic illustration of a verification report 1100. The verification report 1100 may be a version of the code portion 900 having one or more comments indicating that the detected violation is justified. In particular, new comment lines 10-13, indicated at 1102, may be inserted. The new comment lines 10-13 indicate that the detected violation of Rule 10.6 at line 9 of the code portion 900 is proven to be justified, e.g., it will not cause any undesired runtime behavioral impacts.

In some embodiments, the code verification engine 102 may be configurable, for example user configurable. An organization, such as a software development company, may configure the code verification engine 102 to include one or coding rules custom defined by the company. The company may also define or create its own coding standard that may include custom-defined coding rules created by the company, selected coding rules specified in a published coding standard, such as the MISRA coding standards, or some combination of custom-defined and published coding rules. Custom-defined coding rules may test for best practices, violations of formatting rules, etc. The company may also configure the code verification engine 102 to include custom-defined code verification checks, and to utilize predefined and/or custom-defined code verification checks 114 for the coding rules of its coding standard. In some embodiments, the company may define its own verification check to be used with its custom-defined coding rule.

For example, a company may define a coding rule that specifies that all global variables are to begin with "glb\_". A rationale for such a rule may be to ensure that all global variables are correctly initialized. The company may configure the coding rules database 110 to include this custom-defined coding rule. The company may also associate one or more code verification checks with the custom-defined coding rule. In this example, the company may associate the Non-initialized variable (NIV) check, which proves whether a variable is not initialized before being read with its custom-defined coding rule.

FIG. 12 is a schematic illustration of a code portion 1200. The code portion 1200 includes a plurality of lines of code. At line 1, indicated at 1202, the code portion 1200 defines a first global variable named "glb_number_of_gears". At line 3, indicated at 1204, the code portion 1200 defines as a second global variable named "number_of_gear_ratios", and sets its initial value to 5. At line 5, indicated at 1206, the code portion 1200 defines a third global variable named "number_of_drive_shafts".

In this example, the defect finder 108 would determine that no violation of the custom-defined rule occurs at line 1 because the global variable defined at line 1 begins with "glb" as required. However, the defect finder 108 would determine that violations of the custom-defined rule occur at lines 3 and 5 because neither of the global variables begin with "glb\_". Applying the NIV check to the violation at line 3, the code verifier 112 would prove that this violation of the custom-defined coding rule is justified because the global variable "number_of_gear_ratios" is initialized to 5, and the rationale for this rule is to avoid global variables not being initialized. That is, the undesired program behavior to be avoided by the custom-defined rule, i.e., incorrectly initialized global variables, will not occur. Accordingly, the code verification engine 102 may designate the violation at line 3 as justified.

Applying the NIV check to the violation at line 5, the code verifier 112 cannot prove that the undesired program behavior will not occur. That is, unlike line 3, line 5 does not initialize the "number of drive shafts" global variable. Accordingly, the code verification engine 102 may designate the violation at line 5 as not justified.

In some embodiments, the code verification engine 102 may be configured through an Application Programming Interface (API) included with or defined for the code verification engine 102.

Justifying Coding Standard Violations Prior to or During Code Generation

In some embodiments, one or more coding rule violations appearing in the automatically generated code 130 may be justified in advance of the coding standard violation analysis performed by the defect finder 108, for example by the code generator 1300 itself. Justifications made in these situations may be referred to as pre-justifications. For example, violations of coding rules may occur knowingly in the generated code 130, e.g., due to particular settings of the code generator 1300.

Figure 13:
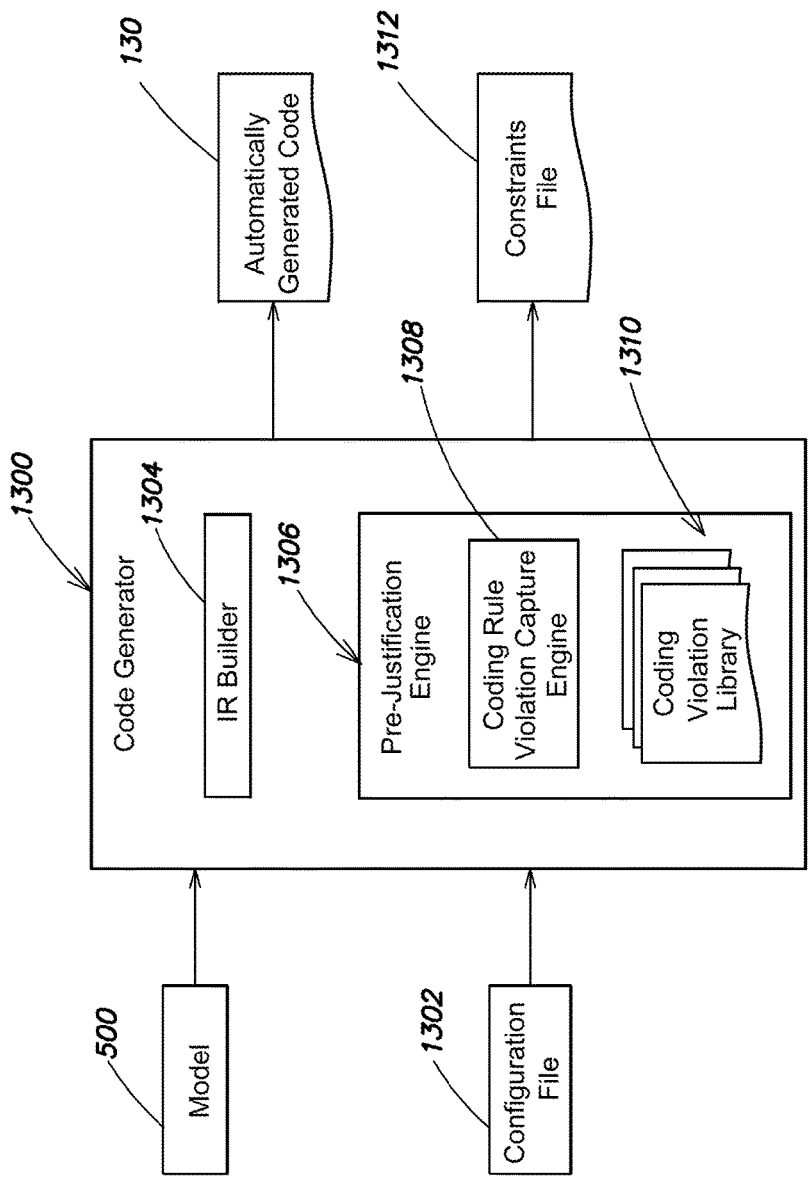
FIG. 13 is a schematic illustration of a code generator in accordance with an embodiment.

FIG. 13 is a schematic illustration of the code generator 1300 in accordance with an embodiment. The code generator 1300 may include logic that converts a program from a first format, such as the model 500, to a second format, such as the automatically generated code 130. The code generator 1300 may receive information configuring the code generator 1300 from one or more data structures, such as a configuration file 1302. For example, the configuration file 1302 may include information about a target hardware platform on which the automatically generated code 130 will be run, constraints that should be satisfied for the generated code 130, e.g., to operate correctly on the target hardware platform, optimizations to be made in the generated code 130, etc. This information may generally be referred to as assertions. Assertions may be manually specified, for example by a user selecting and/or setting one or more code generation options through one or more user interface dialogs. Assertions may also be provided automatically, for example through logic included in the code generator 1300.

The code generator 1300 may include or have access to an Intermediate Representation (IR) builder 1304. In addition, the code generator 1300 may include a pre-justification engine 1306. The pre-justification engine 1306 may include a coding rule violation capture engine 1308 and one or more coding violation libraries indicated generally at 1310. The pre-justification engine 1306 may identify and generate information regarding coding violations appearing in the generated code 130 that are intended and thus deemed to be pre-justified. The pre-justification engine 1306 may record this information in one or more files or other data structures, such as a constraints file 1312.

Figure 14A:
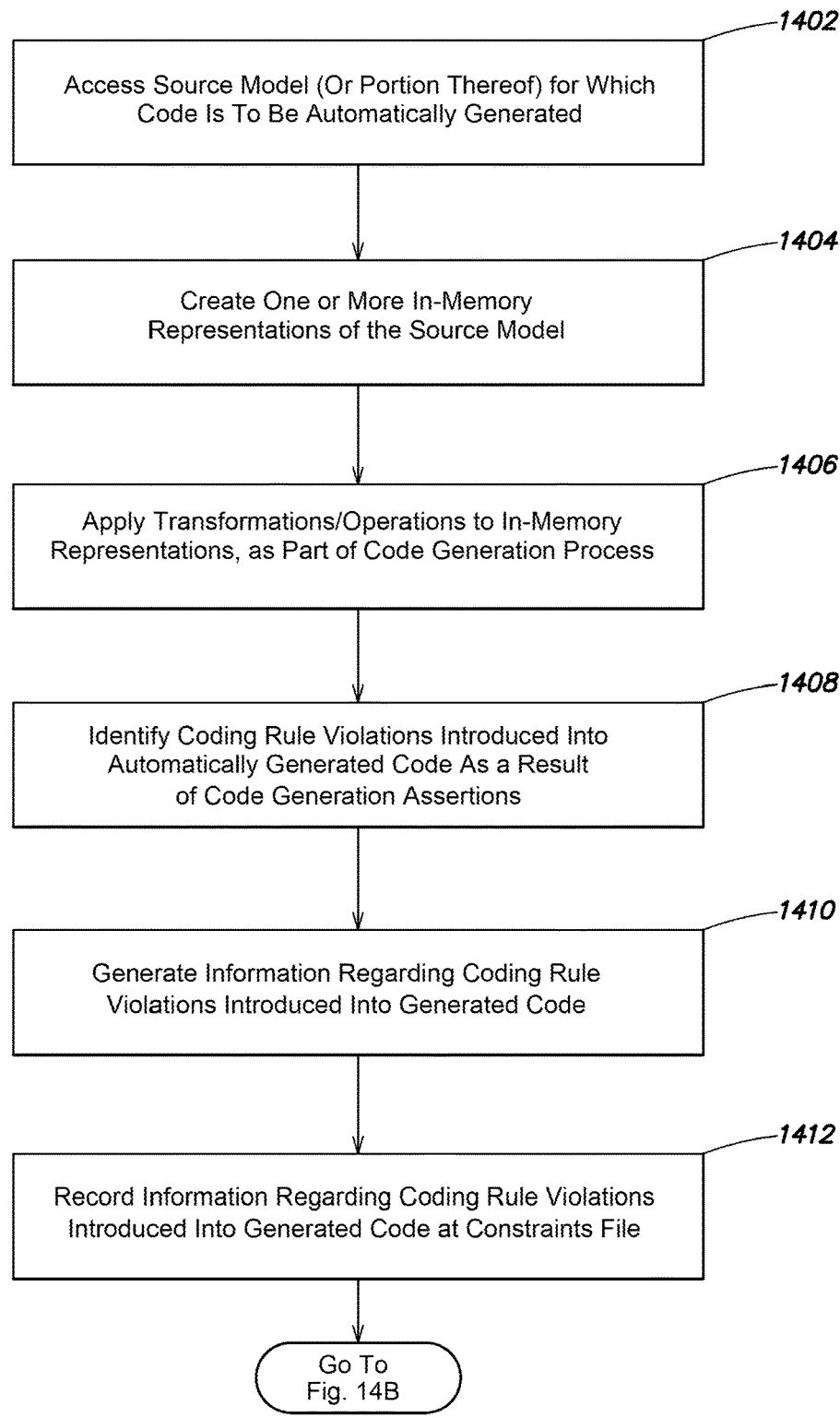
FIGS. 14A-14C are partial views of a flow diagram of a method in accordance with an embodiment.
Figure 14B:
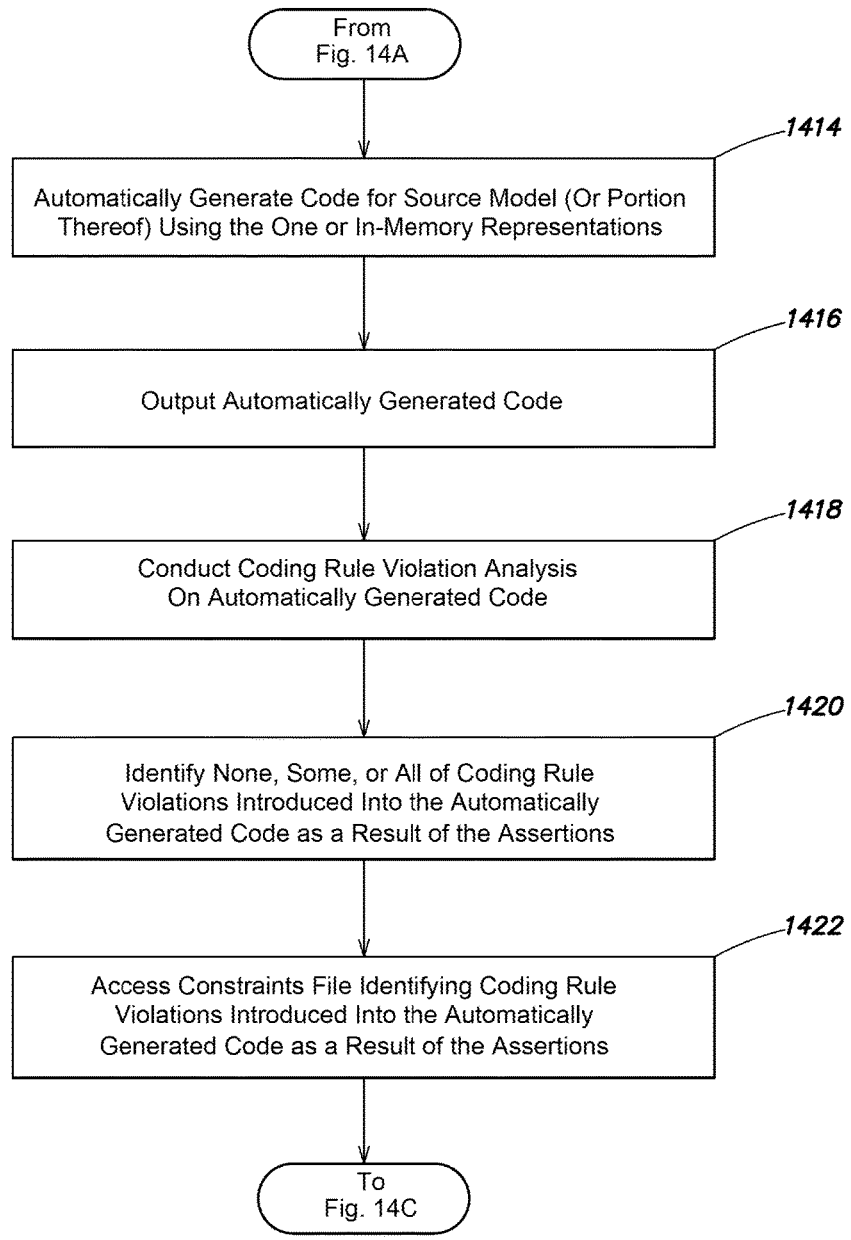
Figure 14C:
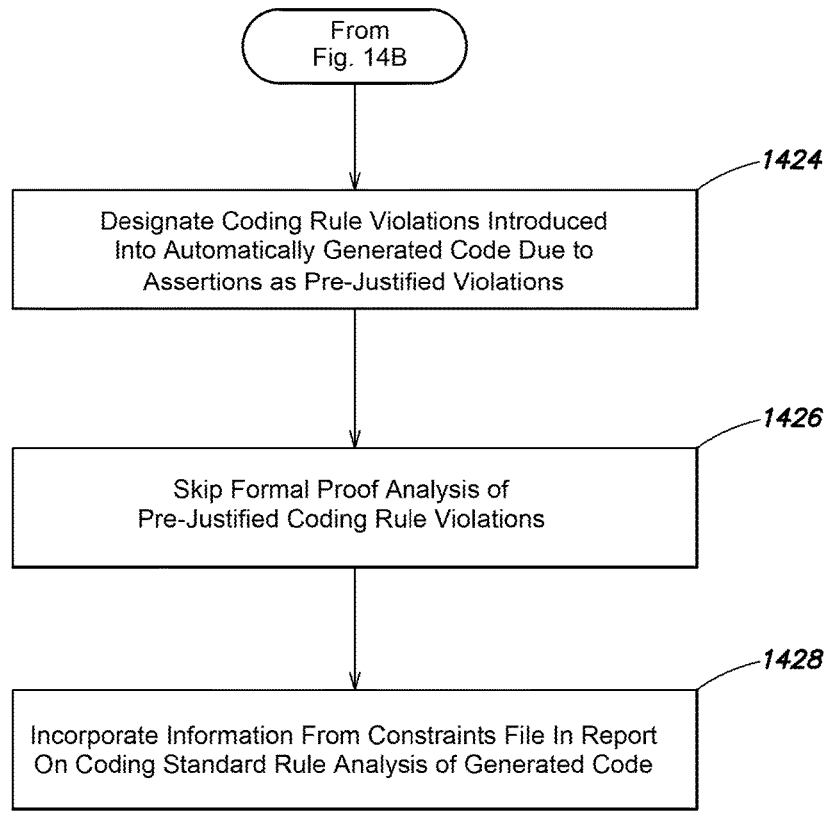

FIGS. 14A-14C are partial views of a flow diagram of a method in accordance with an embodiment.

The code generator 1300 may access a source model (or portion thereof) for which code is to be automatically generated, such as the model 500, as indicated at step 1402. The IR builder 1304 may construct one or more in-memory representations of the model 500, as indicated at step 1404. The code generator 1300 together with the IR builder 1304 may perform a number of operations, such as transformations, on the in-memory representations thereby creating further in-memory representations, as indicated at step 1406. For example, in one transformation, elements of the model may be combined, while in another transformation, arcs of the in-memory representation may be labeled with data type information. The operations and/or transformations that are performed, or the manner in which they are performed may be function of the assertions included in the configuration file. For example, certain operations may be performed so that the generated code satisfies an optimization objective, such as faster execution speed, lower memory usage, etc.

As the code 130 is being generated by the code generator 1300, the pre-justification engine 1306 may identify coding rule violations occurring in the code 130 as a result of the assertions, as indicated at step 1408. For example, the assertions may indicate that the code generator 1300 is to generate code that is optimized for execution on a particular target hardware platform. The particular target hardware platform may have 16-bit data channels, and the assertions may configure the code generator 1300 to generate code that is optimized for 16-bit data channels. Such an optimization, however, may result in the generated code violating one or more rules of a coding standard that are intended to ensure the portability of generated code across many different hardware platforms.

The pre-justification engine 1306 may generate information regarding such violations, as indicated at step 1410. Exemplary information includes the location of the violation in the generated code 130, an identity of the rule that is violated, an identity of the one or more assertions that resulted in the occurrence of the violation in the generated code, an explanation why the violation can be considered to be pre-justified, traceability data, such as hyperlinks, that link to the location of the violation in the generated code and/or to other locations in the generated code that may further explain why the violation occurred and/or why it may be considered to be pre-justified and even one more lines of code to validate the assertion. The pre-justification engine 1306 may store some or all of this information in the constraints file 1312, as indicated at step 1412.

The code generator 1300 may produce the generated code 130 from one or more of the in-memory representations, such as a final in-memory representation, as indicated at step 1414 (FIG. 14B). The generated code 130 may include the coding rule violations occurring as a result of the assertions contained in the configuration file 1302, and these violations may be documented in the constraints file 1312. The code generator 1300 may output the automatically generated code 130, as indicated at step 1416.

The defect finder 108 may perform its coding rule violation analysis of the generated code 130 and/or the code 104, as indicated at step 1418. The defect finder 108 may locate none, some, or all of the coding rule violations introduced into the generated code 130 by the code generator 1300 as a result of the assertions, as indicated at step 1420. The correlation engine 116 may include logic for accessing the constraints file 1312, as indicated at step 1422. Coding rule violations included in the constraints file 1312 may be considered and designated to be pre-justified by the correlation engine 116, as indicated at step 1424 (FIG. 14C). Because the coding rule violations included in the constraints file 1312 are considered to be pre-justified, the correlation engine 116 may direct the code verifier 112 to skip over the violations identified in the constraints file 1312, as indicated at step 1426. This may result in a significant savings in time and resources, and may avoid the introduction of new issues when code is modified.

The report generator 120 may incorporate the constraints file 1312 (or information therefrom) in one or more reports generated regarding the coding rule violation justification process, as indicated at step 1428.

In some embodiments, one or more elements of the code verification engine 102 may be included in the code generator 1300. For example, the code generator 1300 may include the correlation engine 116, the defect finder 108, and/or the code verifier 112.

In some embodiments, other procedures may be employed in connection with the coding rule violations included in the constraints file 1312. For example, the defect finder 108 may include logic for accessing the constraints file 1312 during its analysis of the code 104. In some embodiments, the defect finder 108 may skip over the violations identified in the constraints file 1312 (or those portions or sections of the code that include the violations), thereby treating these violations as being pre-justified. In other words, while the defect finder 108 might otherwise detect these coding rule violations in the code 104, because the violations are identified in the constraints file 1312 as being pre-justified, the defect finder 108 may not mark or otherwise identify them as violations. Furthermore, because the pre-justified violations are not marked by the defect finder 108, the code verifier 112 may not perform any analysis of those violations. On the other hand, the defect finder 108 may identify the violations but mark them pre-justified as such.

In some embodiments, the pre-justification engine 1302 may monitor the code generation process. For example, the pre-justification engine 1302 may monitor the operations and/or transformations being applied to the in-memory representations. The coding rule violation capture engine 1308 may access the coding violation library 1310 to determine whether a particular operation or transformation causes a coding rule violation to appear in the generated code. For example, the coding violation library 1310 may include signatures of coding rule violations that may be introduced intentionally into automatically generated code as a result of assertions being applied by the code generator 1300. The coding rule violation capture engine 1308 may search for and/or detect the occurrence of such violations and report them in the constraints file 1312. As an example, the coding violation library 1310 may include a signature of a coding rule violation that may be introduced when a particular optimization objective is asserted. The coding rule violation capture engine 1308 may include logic for detecting the introduction of such violations 1308 in the generated code 130. In other words, the code generator 1300 may assume that a particular optimization has been implemented correctly even though it will result in a coding violation. However, code may be provided in the constraints file that can be used to validate that the assumption is correct.

Modeling Environment

Figure 15:
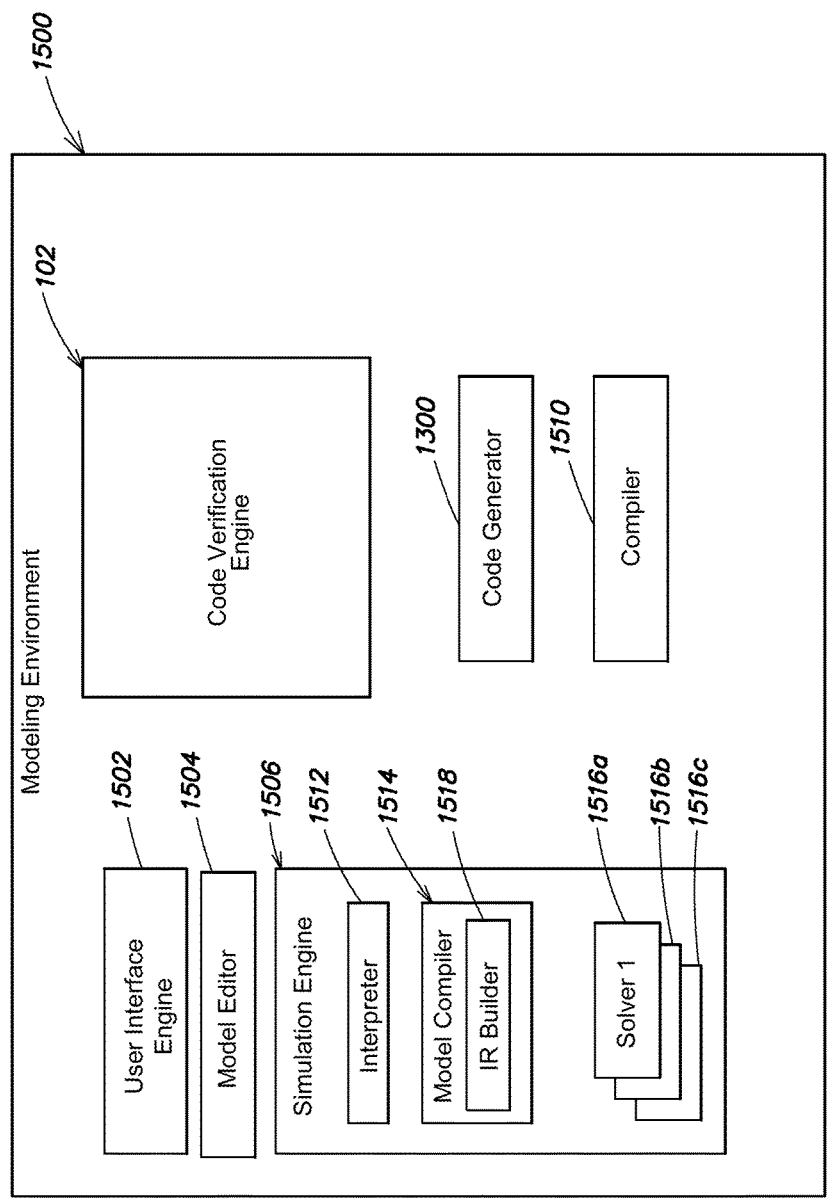
FIG. 15 is a schematic diagram of a modeling environment in accordance with an embodiment.

FIG. 15 is a schematic diagram of a modeling environment 1500 in accordance with an embodiment. The modeling environment 1500 may include a User Interface (UI) engine 1502, a model editor 1504, a simulation engine 1506, the code verification engine 102, the code generator 1300, and a compiler 1510. The UI engine 1502 may create and present one or more User Interfaces (UIs), such as Graphical User Interfaces (GUIs) and/or Command Line Interfaces (CLIs), on a display of a workstation or other data processing device. The UIs may be operated by a user to initiate various model-related tasks, such as opening, constructing, and saving models. The model editor 1504 may perform selected operations, such as open, construct, edit, and save, in response to user inputs.

The simulation engine 1506 may include an interpreter 1512, a model compiler 1514, and one or more solvers, such as solvers 1516a-c. The model compiler 1514 may include one or more Intermediate Representation (IR) builders, such as IR builder 1518. The simulation engine 1506 may execute, e.g., compile and run or interpret, computer-generated simulation models, created or opened by the user, such as the model 500, using one or more of the solvers 1516a-c. Exemplary solvers include one or more fixed-step continuous solvers, which may utilize integration techniques based on Euler's Method or Heun's Method, and one or more variable-step solvers, which may be based on the Runge-Kutta and Dormand-Prince pair. The code generator 1300 may generate code for a model or portion thereof automatically, such as source or object code. The generated code may be in form suitable for execution outside of the modeling environment 1500, and may be referred to as standalone code. The compiler 1510 may compile the generated source code for execution by a target computer platform The modeling environment 1500 may include other modules, such as a differencing engine for comparing two models and identifying the differences between them, a merge engine for merging two models, etc.

In an embodiment, the code verification engine 102 and/or one or more of the parts thereof may be implemented through one or more software modules or libraries containing program instructions pertaining to the methods described herein. The software modules may be stored in a memory, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media. In another embodiment, the code verification engine 102 and/or one or more of the parts thereof may comprise hardware registers and combinational logic configured and arranged to produce sequential logic circuits. In alternative embodiments, various combinations of software and hardware, including firmware, may be utilized to implement the described methods.

In some embodiments, the code generator 1300, the code verification engine 102 and/or one or more parts thereof may be separate from the modeling environment 1500. In such cases, the code generator 1300 and/or the code verification engine 102 may communicate with the modeling environment 1500, e.g., through local procedure calls (LPCs), remote procedure calls (RPCs), an Application Programming Interface (API), or another communication or interface technology.

The modeling environment 1500 may be a high-level modeling application program. Suitable high-level modeling application programs include the MATLAB® algorithm development environment and the Simulink® model-based design environment from The MathWorks, Inc., as well as the Simscape physical modeling system and the Stateflow® state chart tool also from The MathWorks, Inc., the Maple-Sim physical modeling and simulation tool from Waterloo Maple Inc. of Waterloo, Ontario, Canada, the LabVIEW virtual instrument programming system and the NI MatrixX model-based design product from National Instruments Corp. of Austin, Tex., the Rational Rhapsody Design Manager software from IBM Corp. of Somers, N.Y., the Visual Engineering Environment (VEE) from Agilent Technologies, Inc. of Santa Clara, Calif., the System Studmodel-based signal processing algorithm design and analysis tool and the SPW signal processing algorithm tool from Synopsys, Inc. of Mountain View, Calif., a Unified Modeling Language (UML) system, a Systems Modeling Language (SysML) system, and the System Generator system from Xilinx, Inc. of San Jose, Calif. Models created in the high-level modeling environment 1500 may contain less implementation detail, and thus operate at a higher level than certain programming languages, such as the C, C++, C#, and SystemC programming languages.

Those skilled in the art will understand that the MATLAB algorithm development environment is a math-oriented, textual programming environment for digital signal processing (DSP) design, among other uses. The Simulink model-based design environment is a block diagram based design environment for modeling and simulating dynamic systems, among other uses. The MATLAB and Simulink environments provide a number of high-level features that facilitate algorithm development and exploration, and support model-based design, including dynamic typing, array-based operations, data type inferencing, sample time inferencing, and execution order inferencing, among others.

Models constructed in the modeling environment 1500 may include textual models, graphical models, and combinations of graphical and textual models. A model, when executed, may simulate, e.g., approximate the operation of, a system. Exemplary systems include weather systems, financial systems, plants, controllers for factory automation, engine control units (ECUs), anti-lock braking systems (ABS), flight controllers, communication systems, etc. Execution of a model by the modeling environment 1500 may also be referred to as simulating or running the model.

The modeling environment 1500 may implement a graphical programming language having a syntax and semantics, and models may be constructed according to the syntax and semantics defined by the modeling environment 1500. In particular, at least some model elements may represent dynamic systems whose outputs are signals where a signal is a time varying quantity having a value at all points in time during execution of a model, for example at each simulation or time step of model execution. A signal may have a number of attributes, such as signal name, data type, numeric type, and dimensionality.

The model editor 1504 also may present an editor window on the display. The editor window may be a text editor for writing and revising computer programming code, such as source code.

The code verification engine 102 may construct one or more data structures for storing information regarding the detection of coding rule violations and the analysis of those violations. In some embodiments, the code verification engine 102 may create one or more databases, such as a relational database.

Figure 16A:
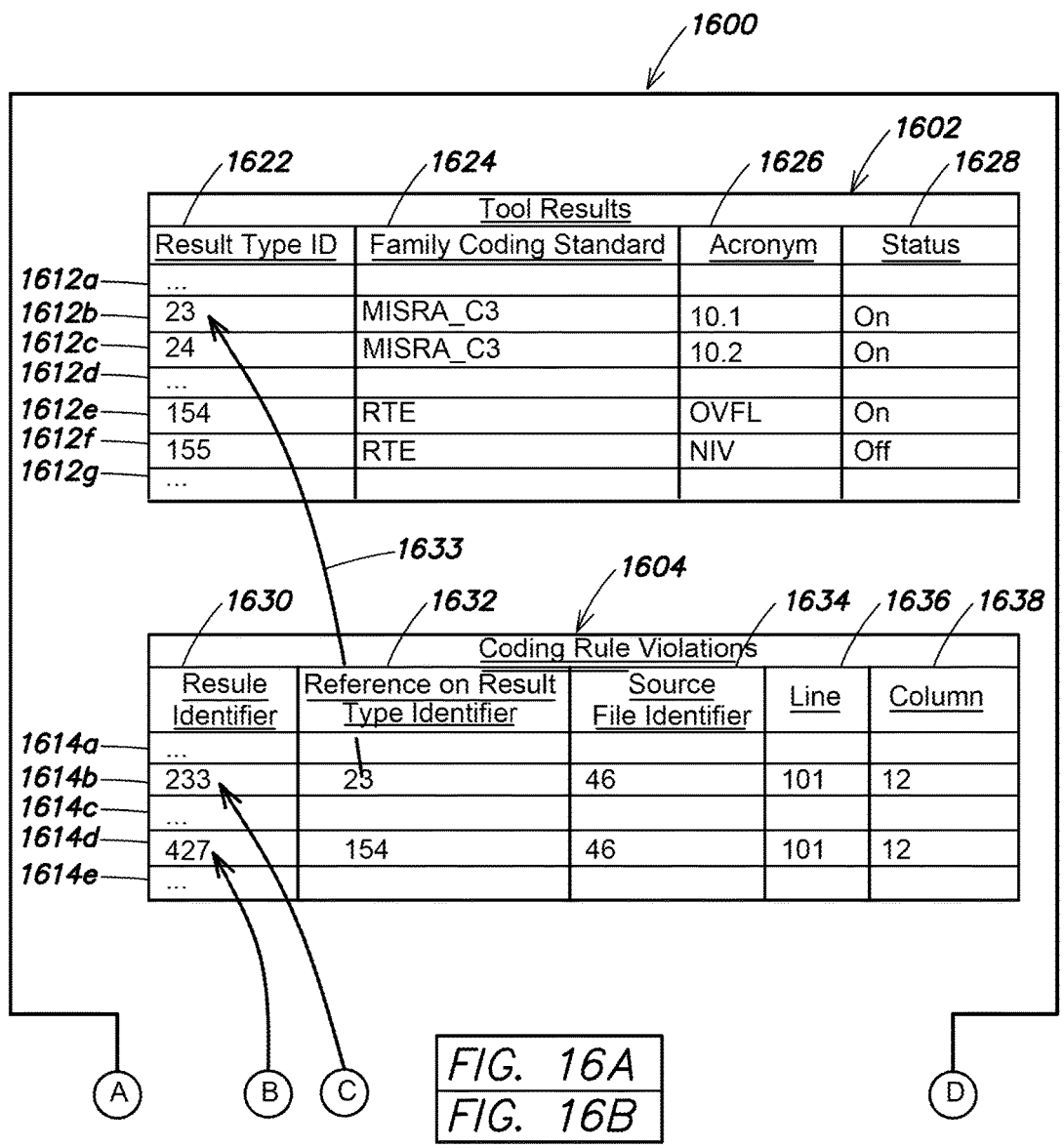
FIGS. 16A and 16B are partial views of a schematic illustration of a data structure in accordance with an embodiment.
Figure 16B:
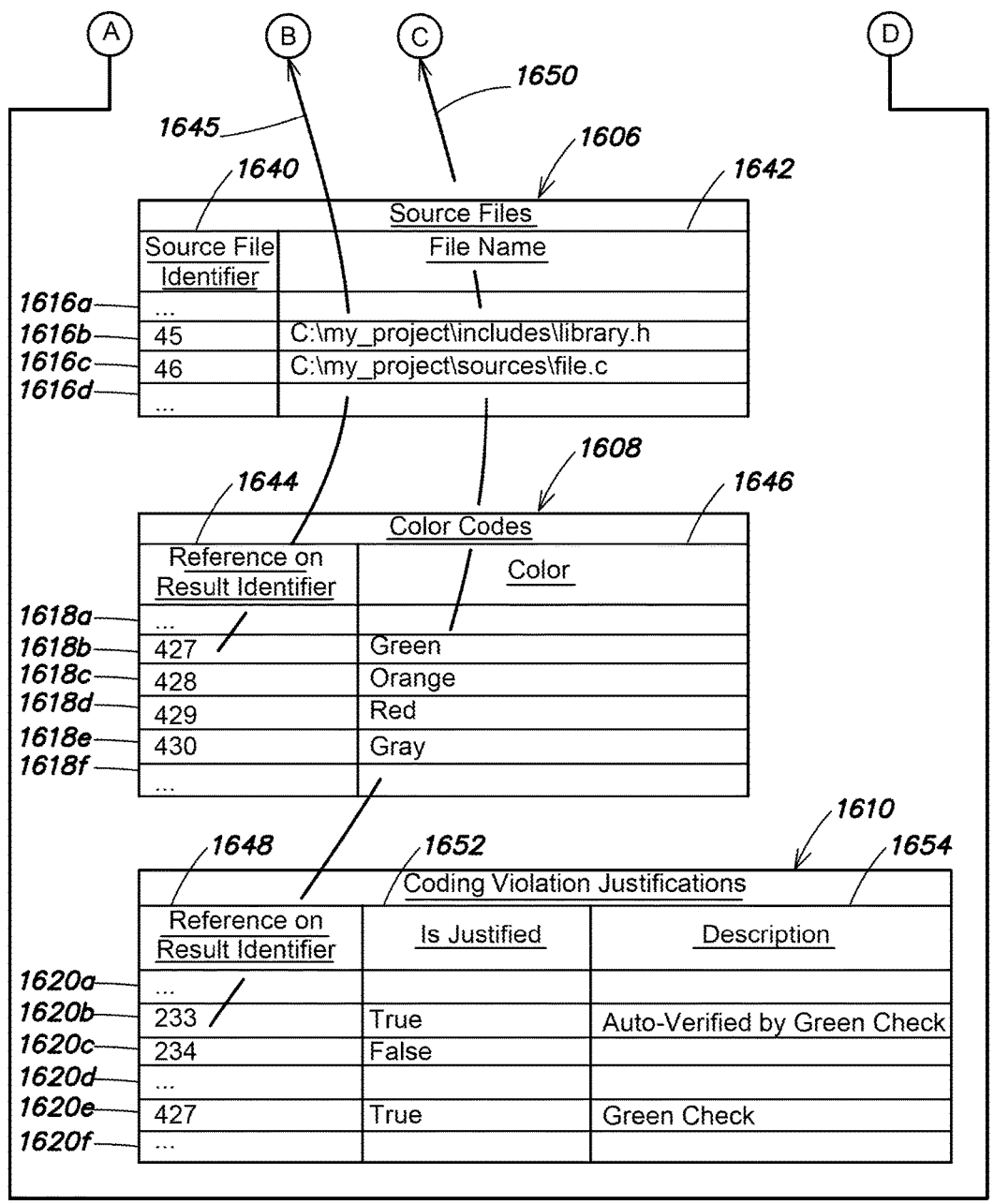

FIGS. 16A and 16B are partial views of a schematic illustration of a relational database 1600 that may be created by the code verification engine 102. The information stored at the database 1600 may be organized into tables. For example, the database 1600 may include a tool results table 1602, a coding rule violations table 1604, a source files table 1606, a color codes table 1608, and a coding violation justifications table 1610. The tables may include columns and rows whose intersections define fields or cells that may store information. The tool results table 1602 may include entries, e.g., rows 1612a-g, for the coding rules 109 (FIG. 1). The coding rule violations table 1604 may include entries, e.g., rows 1614a-e, corresponding to the coding rule violations detected in the code being analyzed, such as code 104. The source files table 1606 may include entries, e.g., rows 1616a-d, for the source files or other code elements that make up the code being analyzed. The color codes table 1608 may include entries, e.g., rows 1618a-f, identifying the color codes assigned to the detected coding rule violations. The coding violation justifications table 1610 may include entries, e.g., rows 1620a-f, indicating whether the detected coding rule violations are justified.

The tool results table 1602 may include a Result Type Identifier (ID) column 1622, which may include an identifier, such as a numeric identifier, assigned to the coding rules stored in the table 1602. Each coding rule may be assigned a unique identifier. The table 1602 may include a Family column 1624, which may specify the standard to which the respective coding rule belongs, if any, such as MISRA, Run-Time Error (RTE), etc. The table 1602 may include an Acronym column 1626, which may contain an acronym, abbreviation, or other identifying characteristic of the respective coding rule. The table 1602 may include a Status column 1628, which may indicate whether the respective coding rule will be applied to the code during analysis. In the Status column 1628, 'on' may mean that the respective coding rule will be applied, and 'off' may mean that the respective coding rule will not be applied. In some implementations, one or more coding rules, such as one or more RTEs, may be turned On, e.g., enabled, by default. For such coding rules, the respective Status entry may be empty or set to N/A.

The coding rule violations table 1604 may include a Result identifier (ID) column 1630, which may include an identifier, such as a numeric identifier, assigned to the respective violation. Each detected violation may be assigned a unique identifier. The table 1604 may include a Reference on result type identifier column 1632, which may include references to result type ID entry of the tool results table 1602, as indicated by arrow 1633. The table 1604 may include a Source file identifier column 1634, which may include an identifier assigned to a source file or other code element of the code being analyzed. Each source file or other code element may be assigned a unique identifier. The table 1604 may include a Line column 1636 and a Column column 1638, which may include the line(s) and column(s) where the respective coding rule violation is detected. For example, row 1614b of the table 1604 corresponds to a detected violation that is assigned result identifier 233. The ID of the type of violation is 23, which corresponds to a Rule 10.1 of the MISRA C coding standard, as indicated at row 1612b of the tool results table 1602. The detected violation of row 1614b occurred in source file identifier 46, at Line 101, and Column 12.

The source files table 1606 may include a Source file identifier column 1640, which may include an identifier, such as a numeric identifier, assigned to a portion of the code being analyzed, such as a source code file. The table 1606 also may include a File Name column 1642, which may include the directory path and file name of the respective source code file. As indicated at row 1616c, source file ID 46, in which the coding rule violation of row 1614b was detected, corresponds to the code's file.c file which is located at C:\my_project\sources.

The color codes table 1608 may include a Reference on result identifier column 1644, which may include references to result identifiers of the coding rule violations table 1604, as indicated by arrow 1645. The table 1608 also may include a Color column, which may include the identity of the color assigned to the respective coding rule violation. As noted, exemplary colors include Green, Orange, Red, and Gray, where Green identifies a portion of code proven to be free of run time errors, Orange identifies a portion of code where an error may occur on some executions of the code, Red identifies a portion of code where an error occurs each time the code is executed, and Gray identifies unreachable code. As indicated at row 1618b, result identifier 427 is assigned the color Green.

The coding violation justifications table 1610 may include a Reference on result identifier column 1648, which may include references to result identifiers of the coding rule violations table 1604, as indicated by arrow 1650. The table 1610 may include an Is justified column 1652, which may include an indication whether the respective violation is justified, not justified, or unresolved. For example, the value 'true' may indicate a justified violation, while a value 'false' may indicate a not justified violation. The table 1610 also may include a Description column 1654, which may include information indicating how the justification decision was reached. For example, the Description column 1654 may indicate that the code verification check proved that the undesired behavior will not occur, e.g., an outcome having a green color code. In other cases, the Description column 1654 may include information indicating that a violation is justified by a range of variables involved in the operation. It should be understood that other information may be included in the Description column 1654. As indicated at row 1620*b*, coding rule violation 233 is deemed justified because the associated code verification check proved that the respective undesired program behavior will not occur.

It should be understood that the relational datable 1600 and the tables 1602-1610 are meant for illustrative purposes, and that other, additional or fewer data structures may be created.

FIGS. 16A and 16B are meant for illustrative purposes only. It should be understood that other data structures in addition to or besides the relational database 1600 may be implemented and/or utilized.

Illustrative Data Processing System

Figure 17:
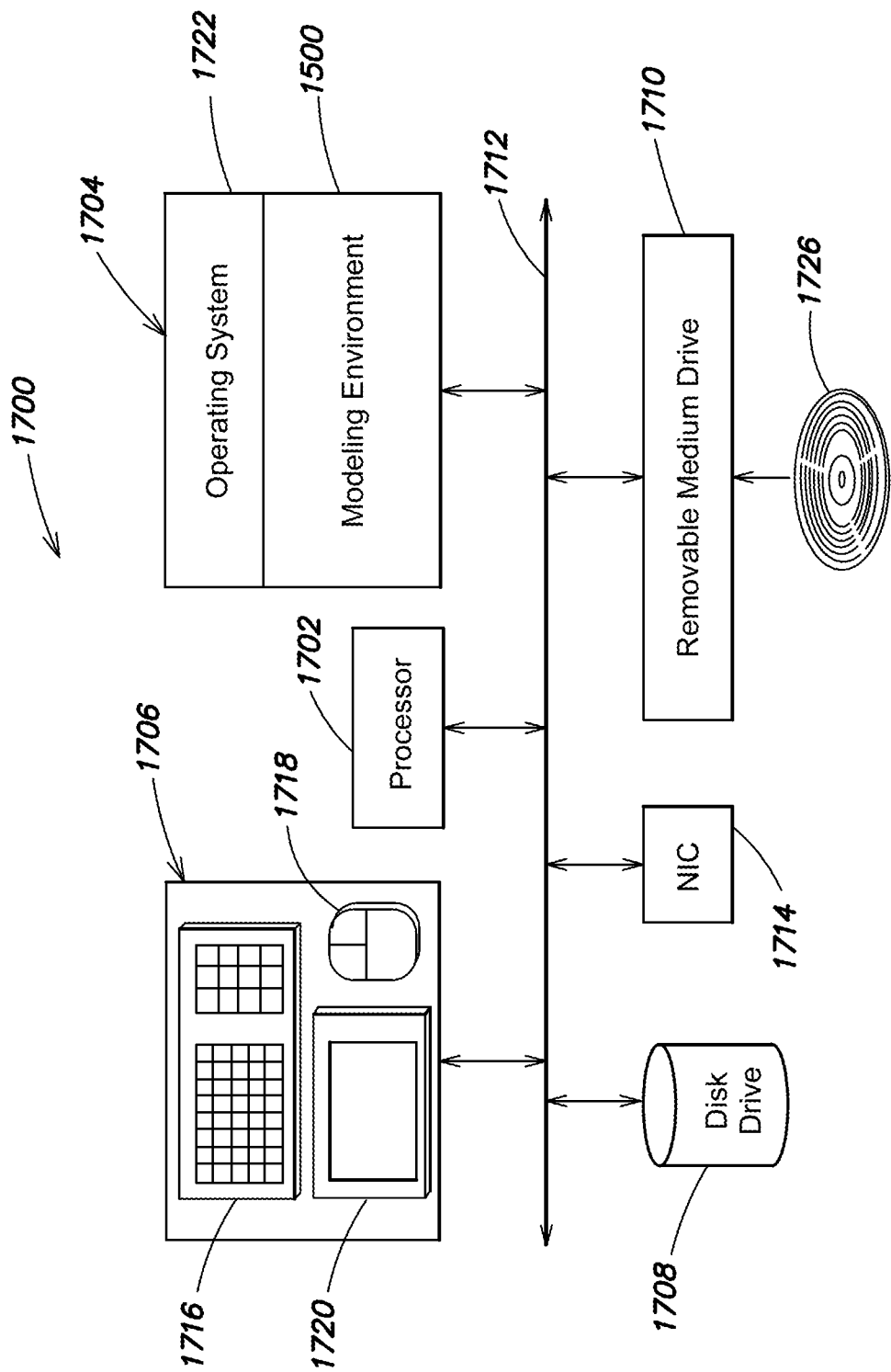
FIG. 17 is a schematic illustration of a data processing system in accordance with an embodiment.

FIG. 17 is a schematic illustration of a computer or data processing system 1700 for implementing an embodiment of the invention. The computer system 1700 may include one or more processing elements, such as a processor 1702, a main memory 1704, user input/output (I/O) 1706, a persistent data storage unit, such as a disk drive 1708, and a removable medium drive 1710 that are interconnected by a system bus 1712. The computer system 1700 may also include a communication unit, such as a network interface card (NIC) 1714. The user I/O 1706 may include a keyboard 1716, a pointing device, such as a mouse 1718, and a display 1720. Other user I/O 1706 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1704, which may be a Random Access Memory (RAM), may store a plurality of program libraries or modules, such as an operating system 1722, and one or more application programs that interface to the operating system 1722, such as the modeling environment 1500.

The removable medium drive 1710 may accept and read a computer readable medium 1726, such as a CD, DVD, floppy disk, solid state drive, tape, flash memory or other non-transitory medium. The removable medium drive 1710 may also write to the computer readable medium 1726.

One or more of the mapping database 118, the coding rules database 110, or the relational database 1600 may be stored at the main memory 1704, the persistent memory, e.g., hard drive 1708, and/or the computer readable medium 1726.

Suitable computer systems include personal computers (PCs), workstations, servers, laptops, tablets, palm computers, smart phones, electronic readers, and other portable computing devices, etc. Nonetheless, those skilled in the art will understand that the computer system 1700 of FIG. 17 is intended for illustrative purposes only, and that the present invention may be used with other computer, data processing, or computational systems or devices. The present invention may also be used in a computer network, e.g., client-server, architecture, or a public and/or private cloud computing arrangement. For example, the modeling environment 1500 may be hosted on one or more cloud servers or devices, and accessed by remote clients through a web portal or an application hosting system, such as the Remote Desktop Connection tool from Microsoft Corp.

Suitable operating systems 1722 include the Windows series of operating systems from Microsoft Corp. of Redmond, Wash., the Android and Chrome OS operating systems from Google Inc. of Mountain View, Calif., the Linux operating system, the MAC OS® series of operating systems from Apple Inc. of Cupertino, Calif., and the UNIX® series of operating systems, among others. The operating system 1722 may provide services or functions for applications or modules, such as allocating memory, organizing data objects or files according to a file system, prioritizing requests, managing I/O, etc. The operating system 1722 may run on a virtual machine, which may be provided by the data processing system 1700.

As indicated above, a user, such as an engineer, scientist, programmer, developer, etc., may utilize one or more input devices, such as the keyboard 1716, the mouse 1718, and the display 1720 to operate the modeling environment 1500, and construct one or more models and/or write computer programming code. As discussed, the models may be computational and may have executable semantics. In particular, the models may be simulated or run. In particular, the models may provide one or more of time-based, event-based, state-based, message-based, frequency-based, control-flow based, and dataflow-based execution semantics. The execution of a model may simulate operation of the system that is being designed or evaluated. The term graphical model is intended to include graphical program.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1700. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. For example, the code verification checks may test for or prove the existence or absence of errors other than runtime errors. Therefore, it is the object of the appended claims to cover all such variations and modifications as come within the true spirit and scope of the disclosure.

What is claimed is:

1. An apparatus comprising:
   a storage medium storing computer programming code; and
   a processor coupled to the storage medium, the processor configured to:
     detect, within the computer programming code, a violation of a coding rule;
     identify a code verification check that corresponds to the coding rule detected as being violated based on a data structure storing an association between the code verification check and the coding rule,
   where the code verification check proves an existence or an absence of an undesired program behavior,
     automatically apply the code verification check to the computer programming code, and
     designate the violation of the coding rule as justified if the code verification check proves that the computer programming code does not produce the undesired program behavior.

2. The apparatus of claim 1 wherein
   the coding rule is part of a coding standard that defines a plurality of coding rules,
   the storage medium further includes the data structure& having a mapping of code verification checks to the plurality of coding rules defined by the coding standard, and the identify includes
   perform a look-up on the data structure utilizing the violation of the coding rule.

3. The apparatus of claim 1 wherein the designate the violation of the coding rule as justified includes annotating the computer programming code with a first label indicating that the violation is justified.

4. The apparatus of claim 3 wherein the processor is further configured to indicate that the computer programming code has the violation of the coding standard if the code verification check determines that the computer programming code produces the undesired program behavior, where the indicate includes annotating the computer programming code with a second label indicating that the violation is not justified.

5. The apparatus of claim 4 further comprising a display coupled to the processor, the processor further configured to
   present on the display at least a portion of the computer programming code, where the at least a portion of the computer programming code
   includes the first label or the second label, and
   is presented in a program editor.

6. The apparatus of claim 1 where the coding rule has an underlying rationale, and the code verification check checks whether the underlying rationale of the coding rule may occur during runtime of the computer programming code.

7. The apparatus of claim 1 where the code verification check is implemented as
   range analysis,
   a mathematical check,
   a semantic code analysis, or
   a formal proof.

8. The apparatus of claim 7 wherein the automatically apply the code verification check is performed using static analysis or control and data flow analysis.

9. The apparatus of claim 1 wherein the code verification check utilizes static analysis.

10. The apparatus of claim 1 wherein the computer programming code includes a portion of code generated automatically for a model through a code generation process, and the code generation process introduces at a given location a given violation of the coding rule, the processor further configured to:
    indicate that the given violation of the coding rule is pre-justified.

11. The apparatus of claim 10 wherein the processor is further configured to:
    avoid applying the code verification check at the given location of the given violation of the coding rule indicated to be pre-justified.

12. The apparatus of claim 10 wherein the processor is further configured to suppress the given violation.

13. The apparatus of claim 1 wherein the processor is further configured to:
    determine a location within the computer programming code where the violation of the coding rule occurs, and the code verification check is applied to the location within the computer programming code.

14. The apparatus of claim 1 wherein the code verification check checks for the undesired program behavior during compilation or execution.

15. A method comprising:
    automatically detecting, by a processor, a violation of a coding rule in computer programming code, the violation occurring at a location in the computer programming code;
    identifying, by the processor, one or more code verification checks from a data structure that associates the one or more code verification checks with the coding rule;
    automatically applying, by the processor, the one or more code verification checks, identified from the data structure, to the computer programming code, where the one or more code verification checks utilize static analysis or control and data flow analysis to identify an undesired program behavior;
    in response to the automatically applying the one or more code verification checks, proving that the undesired program behavior is absent from the computer programming code; and
    indicating that the violation of the coding rule at the location in the computer programming code is justified.

16. The method of claim 15 wherein the indicating includes at least one of
    providing an entry in a report, or
    annotating the computer programming code at the location.

17. The method of claim 16 wherein the providing the entry in the report includes adding
    an identity of the violation of the coding rule, and
    a notation that the violation of the coding rule is justified.

18. A method comprising:
  automatically detecting, by a processor, violations of rules of a coding standard in computer programming code;
  for a given violation of a given rule of the coding standard, accessing by the processor a data structure stored at a storage medium coupled to the processor, the data structure including a mapping of code verification checks to the rules of the coding standard, where the code verification checks prove an existence or an absence of an undesired behavior, the accessing including
  identifying, from the data structure, the code verification check that is mapped to the given rule;
  automatically applying by the processor the code verification check identified from the data structure to the given violation detected in the computer programming code, the automatically applying including
  determining that the undesired behavior is absent in the computer programming code at a location of the given violation; and
  denoting that the given violation of the given rule of the coding standard at the location in the computer programming code is justified.

19. The method of claim 18 wherein the code verification checks check whether underlying rationales of the rules may occur.

20. A method comprising:
  accessing at least a portion of an executable graphical model;
  accessing one or more assertions that control a code generation process for the at least a portion of the executable graphical model;
  generating a first in-memory representation of the at least a portion of the executable graphical model;
  applying a transformation to the first in-memory representation, the transformation
    implementing the one or more assertions, and
    resulting in a second in-memory representation;
  including, within code generated for the at least a portion of the executable model, a known violation of a coding rule as a result of the implementing; and
  designating the known violation of the coding rule as pre-justified.

21. The method of claim 20 further comprising:
  generating the code for the at least a portion of the executable graphical model.

22. The method of claim 20 wherein a code generator includes the known violation of the coding rule within the code generated for the at least a portion of the executable model.

23. One or more non-transitory computer-readable media, having stored thereon instructions that when executed by a computing device, cause the computing device to perform operations comprising:
  detecting, within computer programming code stored at a storage medium, a violation of a coding rule;
  identifying a code verification check that corresponds to the coding rule detected as being violated based on a data structure storing an association between the code verification check and the coding rule, where the code verification check proves an existence or an absence of an undesired program behavior,
  automatically applying the code verification check to the computer programming code, and
  designating the violation of the coding rule as justified if the code verification check proves that the computer programming code does not produce the undesired program behavior.

24. The one or more non-transitory computer-readable media of claim 23 wherein
  the coding rule is part of a coding standard that defines a plurality of coding rules,
  the storage medium further includes the data structure having a mapping of code verification checks to the plurality of coding rules defined by the coding standard, and the identifying includes
  performing a look-up on the data structure utilizing the violation of the coding rule.

25. The one or more non-transitory computer-readable media of claim 23 wherein the designate the violation of the coding rule as justified includes annotating the computer programming code with a first label indicating that the violation is justified.

26. The one or more non-transitory computer-readable media of claim 25 wherein the instructions cause the computing device to perform operations further comprising:
  indicating that the computer programming code has the violation of the coding standard if the code verification check determines that the computer programming code produces the undesired program behavior, where the indicating includes annotating the computer programming code with a second label indicating that the violation is not justified.

27. The one or more non-transitory computer-readable media claim 26 wherein the instructions cause the computing device to perform operations further comprising:
  presenting on a display at least a portion of the computer programming code, where the at least a portion of the computer programming code
    includes the first label or the second label, and
    is presented in a program editor.

28. The one or more non-transitory computer-readable media of claim 23 where the coding rule has an underlying rationale, and the code verification check checks whether the underlying rationale of the coding rule may occur during runtime of the computer programming code.

29. The one or more non-transitory computer-readable media of claim 23 where the code verification check is implemented as
  range analysis,
  a mathematical check,
  a semantic code analysis, or
  a formal proof.

30. The one or more non-transitory computer-readable media of claim 29 wherein the automatically applying the code verification check is performed using static analysis or control and data flow analysis.

31. The one or more non-transitory computer-readable media of claim 23 wherein the computer programming code includes a portion of code generated automatically for a model through a code generation process, and the code generation process introduces at a given location a given violation of the coding rule, the instructions cause the computing device to perform operations further comprising:
  indicating that the given violation of the coding rule is pre-justified.

32. The one or more non-transitory computer-readable media of claim 31 wherein the instructions cause the computing device to perform operations further comprising:

avoiding applying the code verification check at the given location of the given violation of the coding rule indicated to be pre-justified.

33. The one or more non-transitory computer-readable media of claim 31 wherein the instructions cause the computing device to perform operations further comprising:
suppressing the given violation.

34. The one or more non-transitory computer-readable media of claim 23 wherein the instructions cause the computing device to perform operations further comprising:
determining a location within the computer programming code where the violation of the coding rule occurs, and the code verification check is applied to the location within the computer programming code.

35. The one or more non-transitory computer-readable media of claim 23 wherein the code verification check checks for the undesired program behavior during compilation or execution.

36. One or more non-transitory computer-readable media, having stored thereon instructions that when executed by a computing device, cause the computing device to perform operations comprising:
automatically detecting a violation of a coding rule in computer programming code, the violation occurring at a location in the computer programming code;
identifying one or more code verification checks from a data structure that associates the one or more code verification checks with the coding rule;
automatically applying the one or more code verification checks, identified from the data structure, to the computer programming code, where the one or more code verification checks utilize static analysis or control and data flow analysis to identify an undesired program behavior;
in response to the automatically applying the one or more code verification checks, proving that the undesired program behavior is absent from the computer programming code; and
indicating that the violation of the coding rule at the location in the computer programming code is justified.

37. The one or more non-transitory computer-readable media of claim 36 wherein the indicating includes at least one of
providing an entry in a report, or
annotating the computer programming code at the location.

38. The one or more non-transitory computer-readable media of claim 37 wherein the providing the entry in the report includes adding
an identity of the violation of the coding rule, and
a notation that the violation of the coding rule is justified.

39. One or more non-transitory computer-readable media, having stored thereon instructions that when executed by a computing device, cause the computing device to perform operations comprising:
automatically detecting violations of rules of a coding standard in computer programming code;
for a given violation of a given rule of the coding standard, accessing a data structure stored at a storage medium coupled to the processor, the data structure including a mapping of code verification checks to the rules of the coding standard, where the code verification checks prove an existence or an absence of an undesired behavior, the accessing including
identifying, from the data structure, the code verification check that is mapped to the given rule;
automatically applying the code verification check identified from the data structure to the given violation detected in the computer programming code, the automatically applying including
determining that the undesired behavior is absent in the computer programming code at a location of the given violation; and
denoting that the given violation of the given rule of the coding standard at the location in the computer programming code is justified.

40. The one or more non-transitory computer-readable media of claim 39 wherein the code verification checks check whether underlying rationales of the rules may occur.

41. One or more non-transitory computer-readable media, having stored thereon instructions that when executed by a computing device, cause the computing device to perform operations comprising:
accessing at least a portion of an executable graphical model;
accessing one or more assertions that control a code generation process for the at least a portion of the executable graphical model;
generating a first in-memory representation of the at least a portion of the executable graphical model;
applying a transformation to the first in-memory representation, the transformation
implementing the one or more assertions, and
resulting in a second in-memory representation;
including, within code generated for the at least a portion of the executable model, a known violation of a coding rule as a result of the implementing; and
designating the known violation of the coding rule as pre-justified.

42. The one or more non-transitory computer-readable media of claim 41 wherein the instructions cause the computing device to perform operations further comprising:
generating the code for the at least a portion of the executable graphical model.

43. The one or more non-transitory computer-readable media of claim 41 wherein a code generator includes the known violation of the coding rule within the code generated for the at least a portion of the executable model.

* * * * *

UNITED STATES PATENT AND TRADEMARK OFFICE
CERTIFICATE OF CORRECTION

| | |
|---|---|
| PATENT NO. | : 10,423,518 B2 |
| APPLICATION NO. | : 15/139670 |
| DATED | : September 24, 2019 |
| INVENTOR(S) | : Stefan David et al. |

It is certified that error appears in the above-identified patent and that said Letters Patent is hereby corrected as shown below:

In the Specification

Column 6, Line 44 reads:
"is not strictly positive, whether a typeid operator derefer-"

Should read:
--is not strictly positive, whether a typed operator derefer- --

Column 7, Lines 16-18 read:
"Non-null this-pointer in method (NNT) – proves a this
pointer dereference to determine whether the pointer is
NULL;"

Should read:
--Non-null this-pointer in method (NNT) – proves a this-
pointer dereference to determine whether the pointer is
NULL;--

Column 7, Line 26 reads:
"dereference of a this pointer or a pointer to a method is valid;"

Should read:
--dereference of a this-pointer or a pointer to a method is valid;--

Column 20, Lines 31-32 read:
"1604 may include a Line column 1636 and a Column
column 1638, which may include the line(s) and column(s)"

Signed and Sealed this
Fifth Day of May, 2020

Andrei Iancu
*Director of the United States Patent and Trademark Office*

Should read:
--1604 may include a Line column 1636 and a column
1638, which may include the line(s) and column(s)--

In the Claims

Column 23, Line 41:
Claim 2 reads:
"the storage medium further includes the data structure&"

Should read:
--the storage medium further includes the data structure--